United States Patent
Minakuchi et al.

(10) Patent No.: US 10,250,561 B2
(45) Date of Patent: Apr. 2, 2019

(54) COMMUNICATION APPARATUS AND COMMUNICATION CONTROL APPARATUS

(71) Applicant: FUJITSU LIMITED, Kawasaki-shi, Kanagawa (JP)

(72) Inventors: Yu Minakuchi, Kawasaki (JP); Hideyuki Matsuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 243 days.

(21) Appl. No.: 15/444,996

(22) Filed: Feb. 28, 2017

(65) Prior Publication Data

US 2017/0289105 A1 Oct. 5, 2017

(30) Foreign Application Priority Data

Mar. 8, 2016 (JP) ................................. 2016-044346

(51) Int. Cl.
*H04L 29/06* (2006.01)
*H04L 12/851* (2013.01)

(52) U.S. Cl.
CPC ...... *H04L 63/0245* (2013.01); *H04L 47/2483* (2013.01); *H04L 63/04* (2013.01); *H04L 63/1491* (2013.01)

(58) Field of Classification Search
CPC . H04L 63/0245; H04L 47/2483; H04L 63/04; H04L 29/06
USPC .......................................................... 726/3
See application file for complete search history.

(56) References Cited

U.S. PATENT DOCUMENTS

| | | | | |
|---|---|---|---|---|
| 7,697,517 B2 * | 4/2010 | Yazaki | ................ | H04L 41/0896 370/389 |
| 2006/0262725 A1* | 11/2006 | Barrett | .................... | H04L 43/12 370/235 |
| 2016/0294511 A1* | 10/2016 | Maheshwari | ......... | H04L 1/0045 |

FOREIGN PATENT DOCUMENTS

| | | |
|---|---|---|
| JP | 9-36914 | 2/1997 |
| JP | 2002-368773 | 12/2002 |
| JP | 2004-88658 | 3/2004 |
| JP | 2009-88765 | 4/2009 |

* cited by examiner

*Primary Examiner* — Evans Desrosiers
(74) *Attorney, Agent, or Firm* — Staas & Halsey LLP

(57) ABSTRACT

A transmission apparatus transmits a plurality of second packets obtained from a plurality of first packets, wherein each of the plurality of first packets includes a header including a first field, and a payload, and includes first information stored in the first field, and wherein each of the plurality of second packets includes second information in the first field instead of the first information, and includes the first information inserted in the payload. A reception apparatus receives the plurality of second packets, deletes the first information from the payload of the received second packet and obtains data included in the payload of the received packet when third information stored in a memory is stored in the second field of a packet received by the reception unit.

15 Claims, 30 Drawing Sheets

ORIGINAL PACKET

EXAMPLE OF PROCESSING ACCORDING TO FIRST EMBODIMENT (1) CHANGE DESTINATION IN HEADER TO FICTITIOUS ADDRESS (2) ADD DUMMY PACKETS (3) INSERT INFORMATION INDICATING ORIGINAL DESTINATION OR DUMMY PACKET

FIG.7

COMMUNICATION PATH INFORMATION TABLE

| SOURCE | DESTI-NATION | SECURE COMMU-NICATION ID | COMMUNI-CATION APPARATUS 1 | COMMUNI-CATION APPARATUS 2 | COMMUNI-CATION APPARATUS 3 | COMMUNI-CATION APPARATUS 4 | COMMUNI-CATION APPARATUS 5 | ... | CONFIRMATION POSITION | DUMMY VALUE |
|---|---|---|---|---|---|---|---|---|---|---|
| TER-MINAL A | TER-MINAL B | 1 | OFSW#1 | OFSW#2 | extNW | OFSW#3 | | ... | FIRST BYTE OF DESTINATION ADDRESS | 0 |
| .. | .. | | .. | .. | .. | .. | .. | .. | .. | |

FIG.9

DESTINATION DETERMINATION TABLE

| SECURE COMMUNICATION ID | OpenFlow SWITCH | SOURCE | FORWARDING DESTINATION | CONFIRMATION POSITION | DUMMY VALUE | OPERATION TYPE |
|---|---|---|---|---|---|---|
| 1 | 1 | TERMINAL A | OFSW#2 | FIRST BYTE OF DESTINATION ADDRESS | 0 | RELAY |
| 1 | 2 | TERMINAL A | DESTINATION IN HEADER | FIRST BYTE OF DESTINATION ADDRESS | 0 | RECEPTION-SIDE |
| 1 | 3 | TERMINAL A | TERMINAL B | FIRST BYTE OF DESTINATION ADDRESS | 0 | TRANSMISSION-SIDE |
| .. | .. | .. | .. | .. | .. | |

FIG.11

PACKET FORWARDING TABLE

| SOURCE | DESTINATION | FORWARDING DESTINATION |
|---|---|---|
| TERMINAL A | — | CONTROLLER |
| .. | .. | .. |

FIG.13

SECURITY COMMUNICATION MANAGEMENT TABLE

| SECURE COMMUNICATION ID | SOURCE | DESTINATION | CONFIRMATION POSITION | DUMMY VALUE |
|---|---|---|---|---|
| 1 | TERMINAL#A | TERMINAL#B | FIRST BYTE OF DESTINATION ADDRESS | 0 |
| .. | | | .. | .. |
| | | | | |

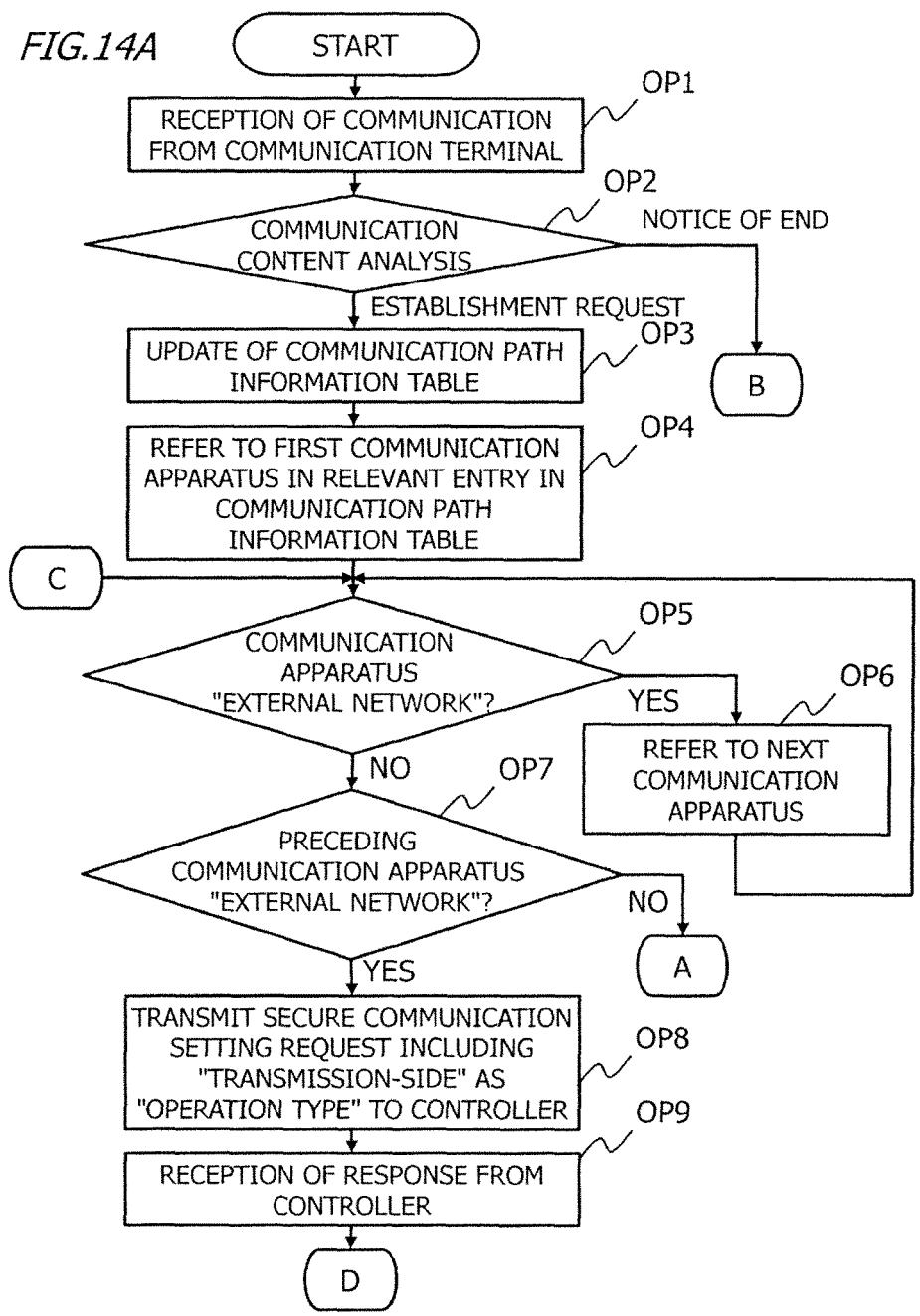

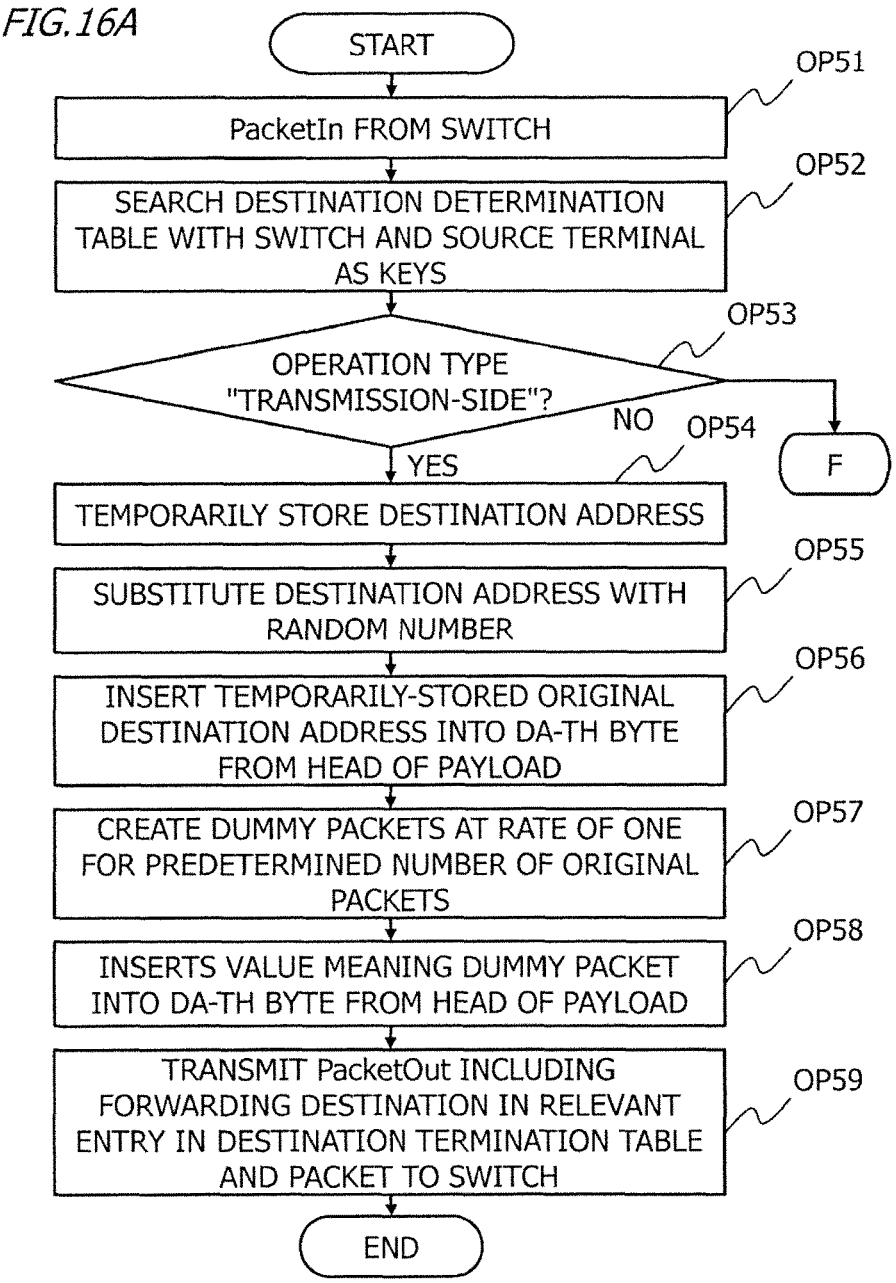

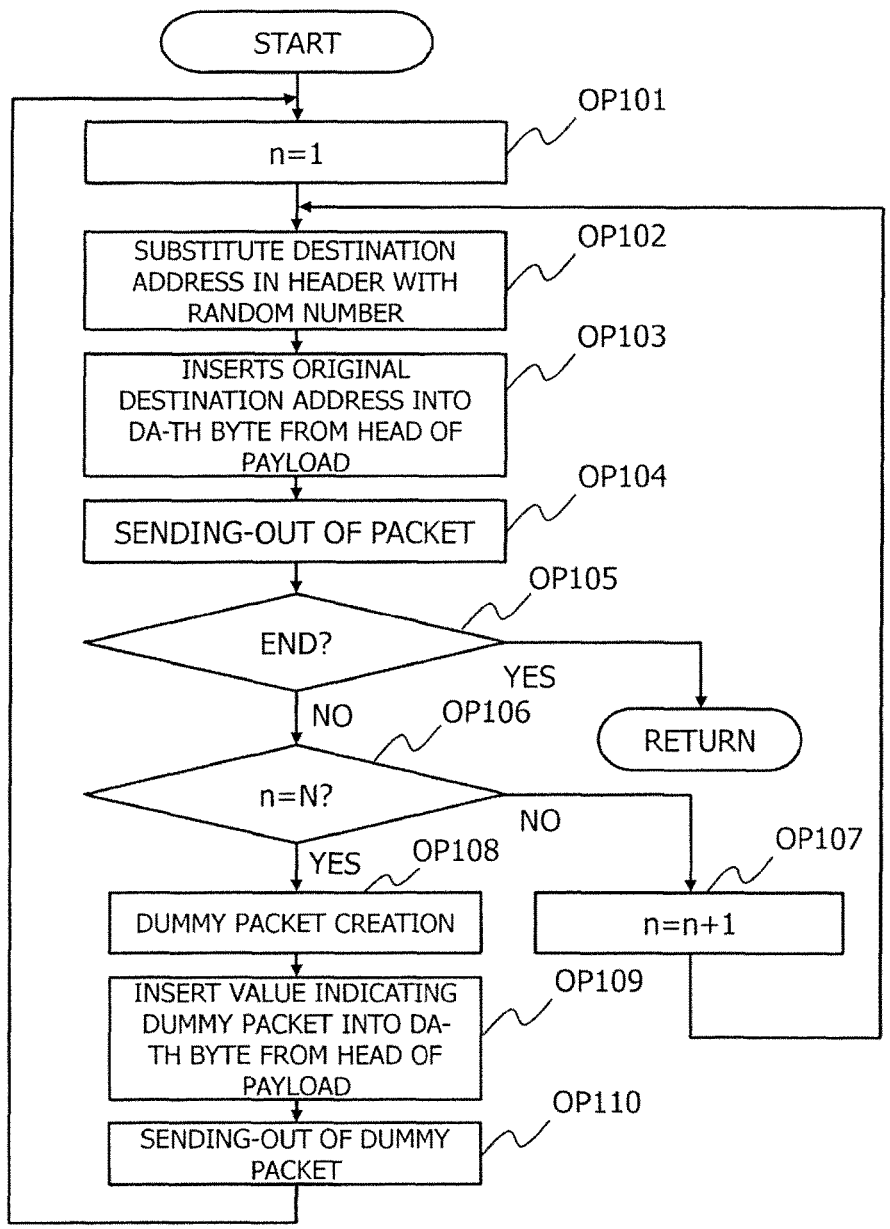

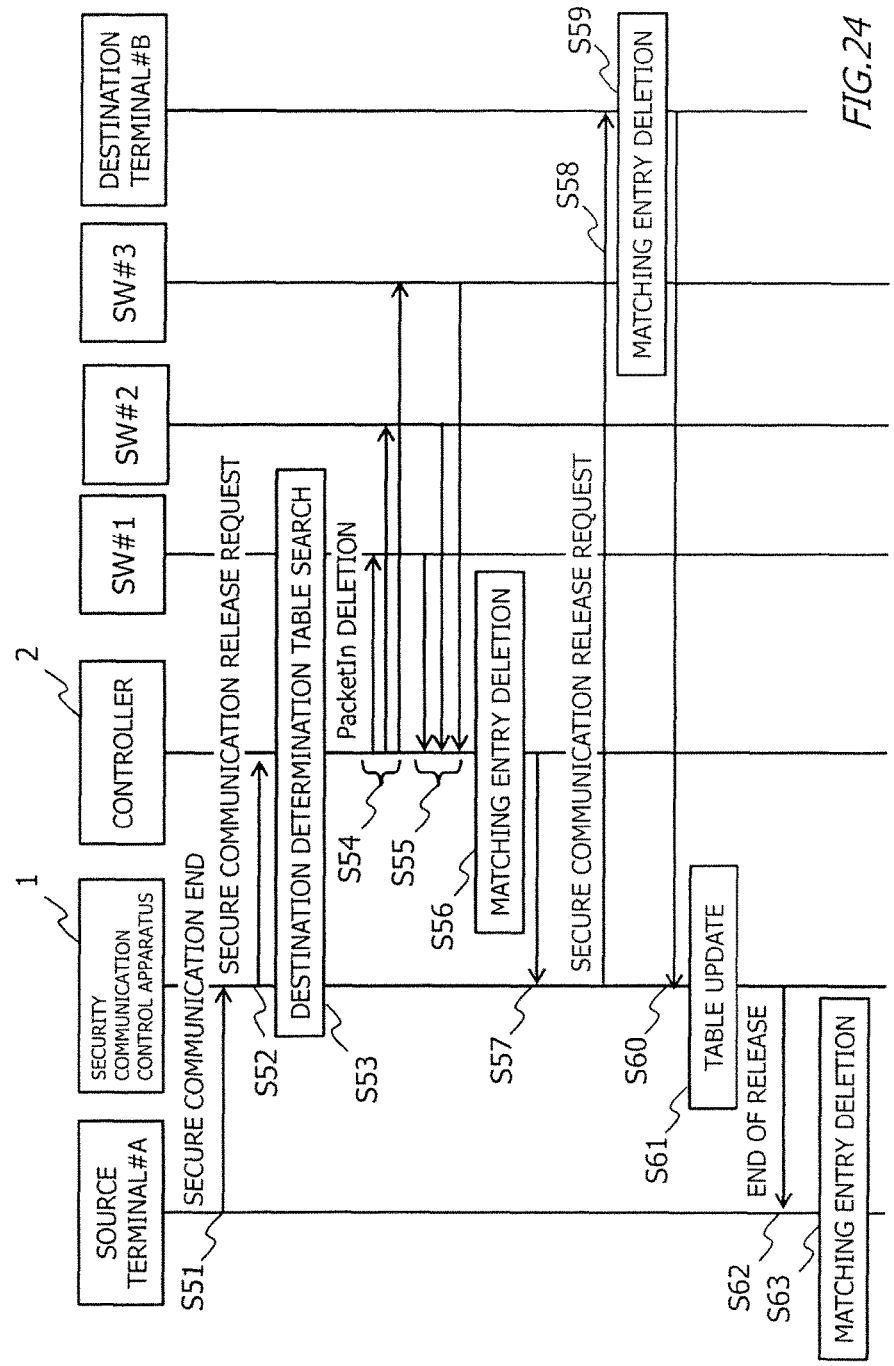

COMMUNICATION APPARATUS AND COMMUNICATION CONTROL APPARATUS

CROSS-REFERENCE TO RELATED APPLICATION

This application is based upon and claims the benefit of priority of the prior Japanese Patent Application No. 2016-044346, filed on Mar. 8, 2016, the entire contents of which are incorporated herein by reference

FIELD

The present invention relates to a communication apparatus, a communication system, a communication control apparatus, a communication method and a communication control method.

BACKGROUND

In a network, a communication between a source apparatus and a destination apparatus is relayed by a relay apparatus, and a communication path is thereby established between the source apparatus and the destination apparatus. If all of packets are abstracted or intercepted by a malicious third party on the communication path, the content of the communication may be leaked. One of countermeasures against the communication content leakage is encryption.

PATENT DOCUMENT

[Patent document 1] Japanese Patent Laid-Open No. 2009-88765

However, in encryption, the payload of each packet is encrypted, but the header of each packet is often not encrypted. The header includes information to be used as flow identification information such as a destination address and a source address. A flow is a flow of packets between two base points. In other words, a flow is a collection of packets sent out to a destination, the packets each including divisional data resulting from division of data to be transmitted, as a payload, and a header provided thereto.

For flow identification, a combination of information pieces such as a destination IP address, a source IP address, a destination port number, a source port number and a protocol ID is used. Which information pieces to be used for flow identification depends on the design of the system.

Even through the payloads are encrypted, if the headers are not encrypted, a malicious third party can abstract all of packets in a communication for an apparatus of interest and identify a flow from information in the headers. If all of the packets from a start to an end of the identified flow are obtained by the third party, the content of the communication transmitted/received between the apparatus of interest and the apparatus with which it is communicating can be restored by putting the payloads of all the packets included in the flow together. Even though the data indicating the content of the communication is encrypted, since the encryption algorithm is publicly known, the content of the communication may be leaked by analyzing the encryption over time at great expense.

SUMMARY

One of aspects of the present invention provides a communication apparatus. The communication apparatus includes a memory, and a processor. The processor is configured to transmit a plurality of second packets obtained from a plurality of first packets, wherein each of the plurality of first packets includes a header including a first field, and a payload, and includes first information stored in the first field, and the plurality of first packets include common identification information that enables flow identification, and wherein each of the plurality of second packets includes second information in the first field instead of the first information, and includes the first information inserted in the payload, and a value of the second information is different between at least two packet groups from among the plurality of first packets.

One of the aspects of the present invention provides a communication control apparatus. The communication control apparatus includes a memory and a processor. The processor is configured to receive a request for a communication from a transmission apparatus to a reception apparatus for transmitting a plurality of second packets obtained from a plurality of first packets; and transmit an instruction for one or more relay apparatuses on a path between the transmission apparatus and the reception apparatus to forward, upon reception of a second packet, the second packet based on first information inserted in payload of the second packet, when the communication request is received, wherein each of the plurality of first packets includes a header including a first field, and a payload, and includes the first information stored in the first field, and the plurality of first packets include common identification information that enables flow identification, and wherein each of the plurality of second packets includes second information in the first field instead of the first information, and includes the first information inserted in the payload, and a value of the second information is different between at least two packet groups from among the plurality of first packets.

One of the aspects of the present invention provides a communication apparatus. The communication apparatus includes a receiver and a processor. The receiver that receives packets including a plurality of second packets obtained from a plurality of first packets, wherein each of the plurality of first packets includes a header including a first field, and a payload, and includes the first information stored in the first field, and the plurality of first packets include common identification information that enables flow identification, and wherein each of the plurality of second packets includes second information in the first field instead of the first information, and includes the first information inserted in the payload, and a value of the second information is different between at least two packet groups from among the plurality of first packets. The processor is configured to, when a second packet is received, determine a forwarding destination of the second packet based on the first information in the payload of the second packet.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWING

FIG. 7 is a diagram illustrating an example of a communication path information table in the security communication control apparatus;

FIG. 9 is a diagram illustrating an example of a destination determination table in the controller;

FIG. 11 is an example of a packet forwarding table in a switch;

FIG. 13 is an example of a security communication management table;

FIG. 14A is an example of a flowchart of processing in a path management unit in the security communication control apparatus;

FIG. 16A is an example of a flowchart of processing in the packet operation unit in the controller upon reception of a PacketIn message from a switch;

FIG. 19B is an example of a flowchart of security communication transmission processing in a communication terminal;

FIG. 24 is a diagram illustrating an example of a sequence of secure communication release processing in the communication system.

DESCRIPTION OF EMBODIMENT

An embodiment of the present invention will be described below with reference to the drawings. The below configuration of the embodiment is a mere example, and the present invention is not limited to the configuration of the embodiment.

First Embodiment

Figure 1:
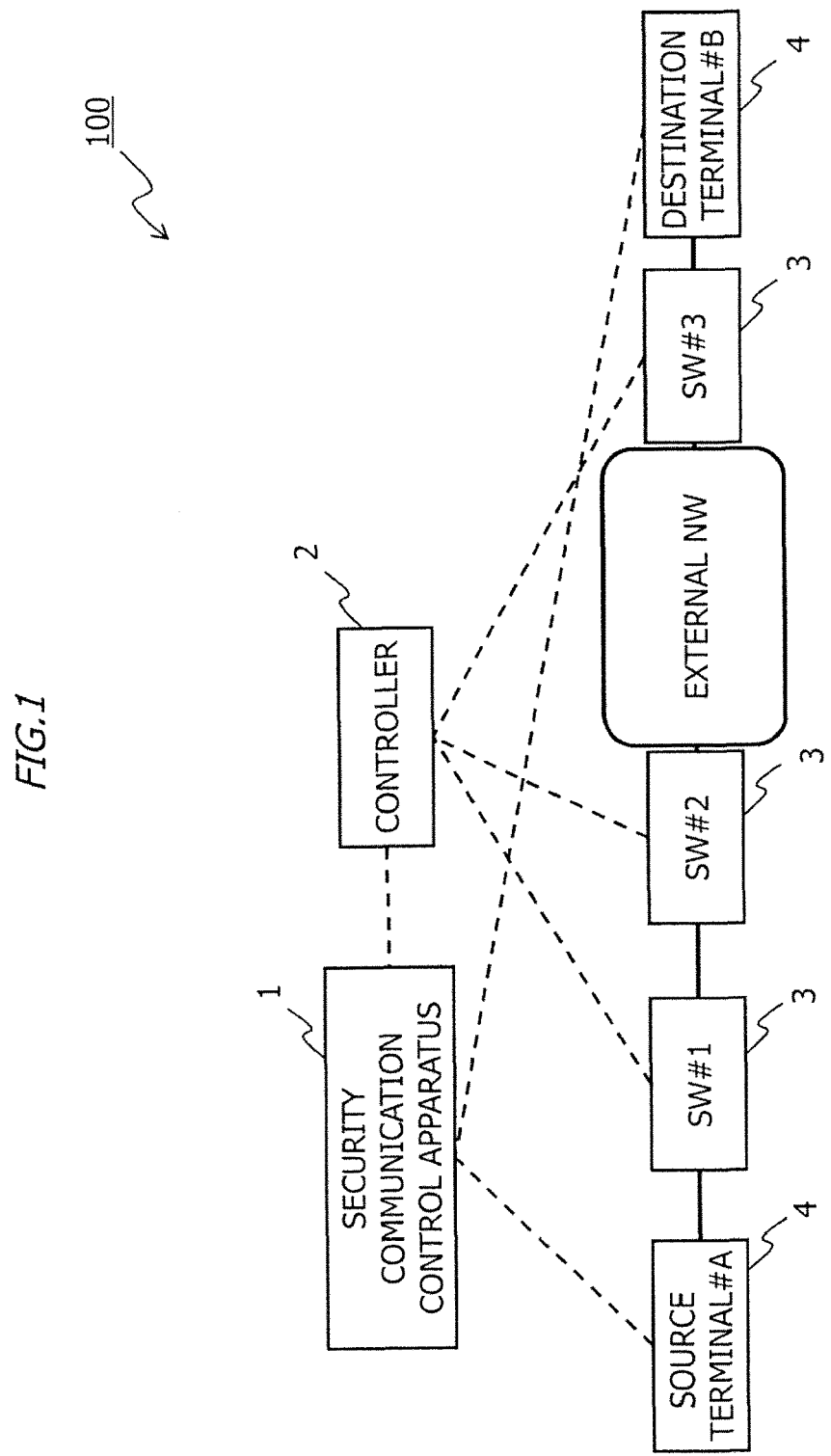
FIG. 1 is a diagram illustrating an example configuration of a communication system according to a first embodiment.

FIG. 1 is a diagram illustrating an example configuration of a communication system 100 according to a first embodiment. In the first embodiment, it is assumed that the communication system 100 is an SDN (software-defined network) network. However, the communication system 100 is not limited to an SDN network.

The communication system 100 includes a security communication control apparatus 1, a controller 2, a plurality of switches 3 and a plurality of communication terminals 4. Each switch 3 is, for example, an SDN switch. The controller 2 is, for example, an SDN controller. An example of the SDN switch is an OpenFlow switch. An example of the SDN controller is an OpenFlow controller.

In FIG. 1, three switches, switch #1 (SW#1), switch #2 (SW#2) and switch #3 (SW#3), are illustrated. Where these switches are collectively referred to, these switches are indicated as switches 3. Where these switches are respectively referred to, these switches are indicated as switch #1, switch #2 and switch #3. Also, in FIG. 1, source terminal #A and destination terminal #B are illustrated as communication terminals. Where these communication terminals are collectively referred to, these communication terminals are indicated as communication terminals 4. Where these communication terminals are respectively referred to, these communication terminals are indicated as source terminal #A and destination terminal #B.

The controller 2 is an apparatus that controls the switches 3. The security communication control apparatus 1 is an apparatus that controls the controller 2 and the communication terminals 4, and controls a communication path equipped with a security measure according to the first embodiment between the communication terminals 4. Hereinafter, a communication equipped with a security measure according to the first embodiment is referred to as secure communication. The security communication control apparatus 1 is an example of "communication control apparatus". Each switch 3 is an example of "relay apparatus".

In the communication system 100, a network through which control signals are transmitted between the switches 3 and the controller 2 and control signals are transmitted between the security communication control apparatus 1, the controller 2 and the communication terminals 4 and a network through which user data is transmitted are physically or logically separated from each other. A protocol that deals with control signals between the switches 3 and the controller 2 and control signals between the security communication control apparatus 1, the controller 2 and the communication terminals 4 is referred to as a control plane. A protocol that deals with user signals that convey user data, which are relayed between the switches 3, is referred to as data plane. In the first embodiment, it is assumed that OpenFlow is used on the control plane between the switches 3 and the controller 2. In FIG. 1, control plane communications are indicated by dotted lines. Data plane communications are indicated by solid lines.

Also, in FIG. 1, there is an external network (external NW) between switch #2 and switch #3. An external network is a network outside the control of the communication system 100. Thus, when a secure communication according to the first embodiment, the secure communication being to be made via the external network, is once converted into a normal communication when the secure communication travels through the external network.

Figure 2:
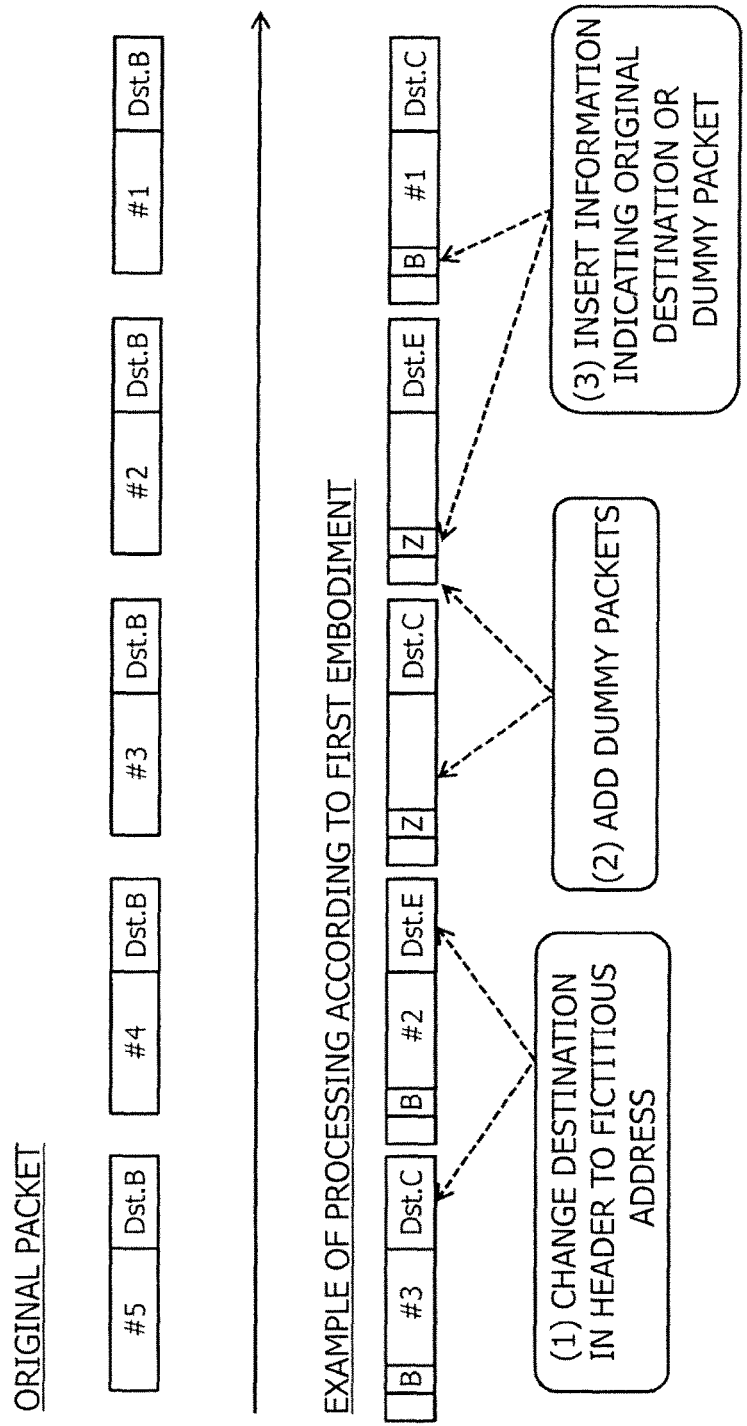
FIG. 2 is a diagram illustrating an example of security measure processing for a secure communication according to the first embodiment.

FIG. 2 is a diagram illustrating security measure processing on a secure communication according to the first embodiment. In the first embodiment, a transmission-side apparatus (1) rewrites a destination address in a header of each packet to a fictitious address, (2) adds dummy packets, and (3) inserts information indicating an original destination address or indicating a dummy packet, to a payload of each packet. A destination address in a header of each dummy packet is also a fictitious address.

Fictitious destination addresses in headers are set so that fictitious destination addresses in at least two packet groups have values that are different from each other from among packets included in a same flow. Setting fictitious destination addresses so that fictitious destination addresses in at least two packet groups have values that are different from each other from among packets included in a same flow is, for example, as follows. In packets included in a same flow, a fictitious destination address of one packet is A, and fictitious destination addresses of the other packets are B. In packets included in a same flow, fictitious destination addresses of a plurality of packets are A, and fictitious destination addresses of the other packets are B. In packets included in a same flow, fictitious destination address in each packet duplicates none of the other packets.

In other words, setting fictitious destination addresses so that fictitious destination addresses in at least two packet groups have values that are different from each other from among packets included in a same flow means setting a fictitious destination address of each of all packets included in a same flow so as to prevent the fictitious destination addresses from having a same value. Also, in order to prevent packets from being identified as packets in a same flow, the setting is made so that there is variability among the fictitious destination addresses.

In the first embodiment, a random number, which is calculated for each packet, is used as a fictitious destination address. Also, a fictitious destination address in a header is partly used for indicating a position in a payload where information indicating an original destination address or indicating a dummy packet is inserted.

A relay apparatus confirms and forwards the information indicating an original destination address or indicating a dummy packet in a payload of each packet.

A reception-side apparatus rewrites the fictitious destination address in the header with the original destination address in the payload of each packet and deletes the original destination address in the payload to reproduce the original packets. Also, in the case of the dummy packets, the reception-side apparatus drops the dummy packets.

In the case of the communication system 100 according to the first embodiment, there is the external network between switch #2 and switch #3. In the external network, forwarding is performed based on a destination address in a header of each packet in a normal format not subjected to the above process. Thus, a switch 3 whose forwarding destination is the external network performs processing that is similar to that of the reception-side apparatus. Also, a switch 3 that forwards packets received from the external network, to a switch 3 outside the external network, performs processing that is similar to that of the transmission-side apparatus.

For example, in FIG. 1, packets in a communication from source terminal #A to destination terminal #B follow a path of source terminal #A, switch #1, switch #2, the external network, switch #3 and destination terminal #B. In this case, apparatuses that each operate as the aforementioned transmission-side apparatus are source terminal #A and switch #3. Also, apparatuses that each operate as the aforementioned reception-side apparatus are destination terminal #B and switch #2. An apparatus that operates the aforementioned relay apparatus is switch #1. Each of the apparatuses that each operate as the transmission-side apparatus and the apparatus that each operate as the reception-side apparatus and the apparatus that operates as the relay apparatus is an example of "communication apparatus". Source terminal #A is an example of "transmission apparatus". Destination terminal #B is an example of "reception apparatus". Switch #1 is an example of "relay apparatus".

Also, since the communication system 100 is assumed to use an SDN network, in the first embodiment, behavior of each switch 3 is controlled by the controller 2. Also, the security communication control apparatus 1 performs setting and setting cancellation relating to secure communication, for source terminal #A, destination terminal #B and controller 2.

In a secure communication according to the first embodiment, destination addresses in respective headers are rewritten to fictitious destination addresses having values that differ between at least two packet groups from among packets included in a same flow. A destination address is a piece of information that is often used as flow identification information. Therefore, in a secure communication according to the first embodiment, it is difficult for a third party to identify packets originally belonging to a same flow as packets belonging to the same flow. A third party can obtain no original communication data unless the third party collects all of packets belonging to one flow. Therefore, a secure communication according to the first embodiment can make it difficult for a third party to analyze the content of the communication.

Also, in the first embodiment, dummy packets are mixed at a predetermined rate, which can make it difficult to analyze the content of the communication.

Figure 3:
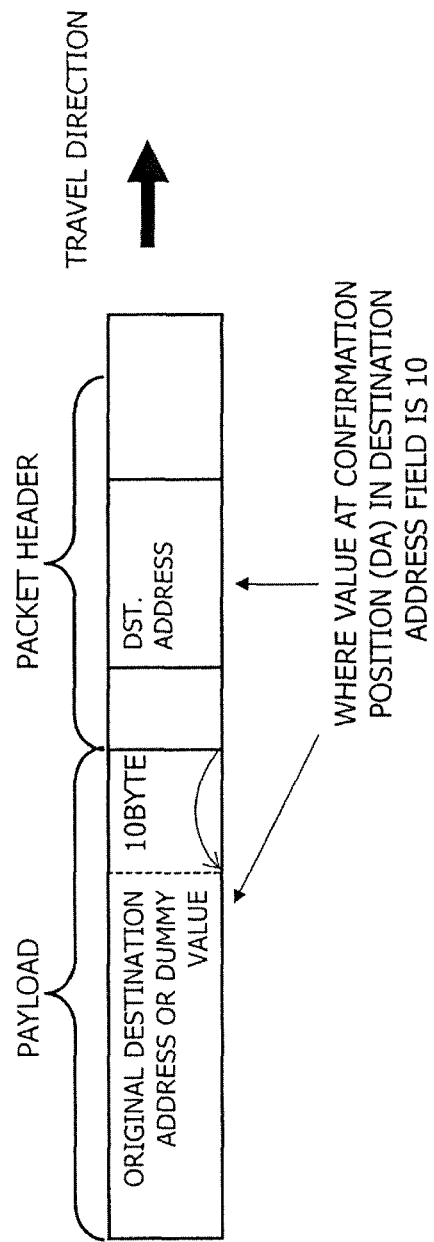
FIG. 3 is a diagram illustrating an example of a configuration of a packet in a secure communication according to the first embodiment.

FIG. 3 is a diagram illustrating an example of a configuration of a packet in a secure communication according to the first embodiment. The packet includes a header and a payload. The header includes information such as a destination IP address and a source IP address. The payload includes data. Normally, in a packet relay, information in the header is referred to.

In the first embodiment, a plurality of consecutive bits (bit string) in 32 bits in a field in a header where a destination address is stored is used as information indicating a position in the relevant payload where an original destination address is inserted. Hereinafter, a position, in a header, of a bit string used as information indicating a position in the relevant payload where an original destination address is inserted is referred to as "confirmation position".

In other words, apparatuses that relay or receive a packet in a secure communication such as the controller 2, the switches 3 and destination terminal #B can obtain a position in the payload where an original destination address is inserted, by referring to a bit string at the confirmation position in the header. If the packet is a dummy packet, a value indicating a dummy packet is stored at a position in the payload, the position corresponding to a value of a bit string at the confirmation position in the header. The value indicating a dummy packet is defined by 32 bits that are the same in size as the destination address.

For example, if a first one byte in a destination address field of a header is a confirmation position and a value of a bit string at the confirmation position is 10, it is indicated that an original destination address is inserted at a position that is the tenth byte from a head of the payload.

In the first embodiment, a fictitious address stored in a destination address field of a header is a random number. In other words, a value of a bit string at a confirmation position, that is, a position in a payload where an original destination address is inserted is randomly determined for each packet. Also, a confirmation position in a header is randomly determined for each secure communication, that is, each flow.

In the first embodiment, an original destination address is an example of "first information". Also, a destination address field of a header is an example of "first field". Also, a value stored in a destination address field of a header instead of an original address (fictitious destination address or random number) is an example of "second information". A packet in a normal communication format is an example of "first packet". A packet in a secure communication format is an example of "second packet". A flow is an example of "plurality of first packets including common identification information that enables flow identification" and an example of "packet group formed by the plurality of first packets". A confirmation position in a header is an example of "predetermined part of the first field". Information indicating a confirmation position in a header is an example of "information relating to a position in a payload of the second packet where first information is inserted".

<Apparatus Configuration>

Figure 4:
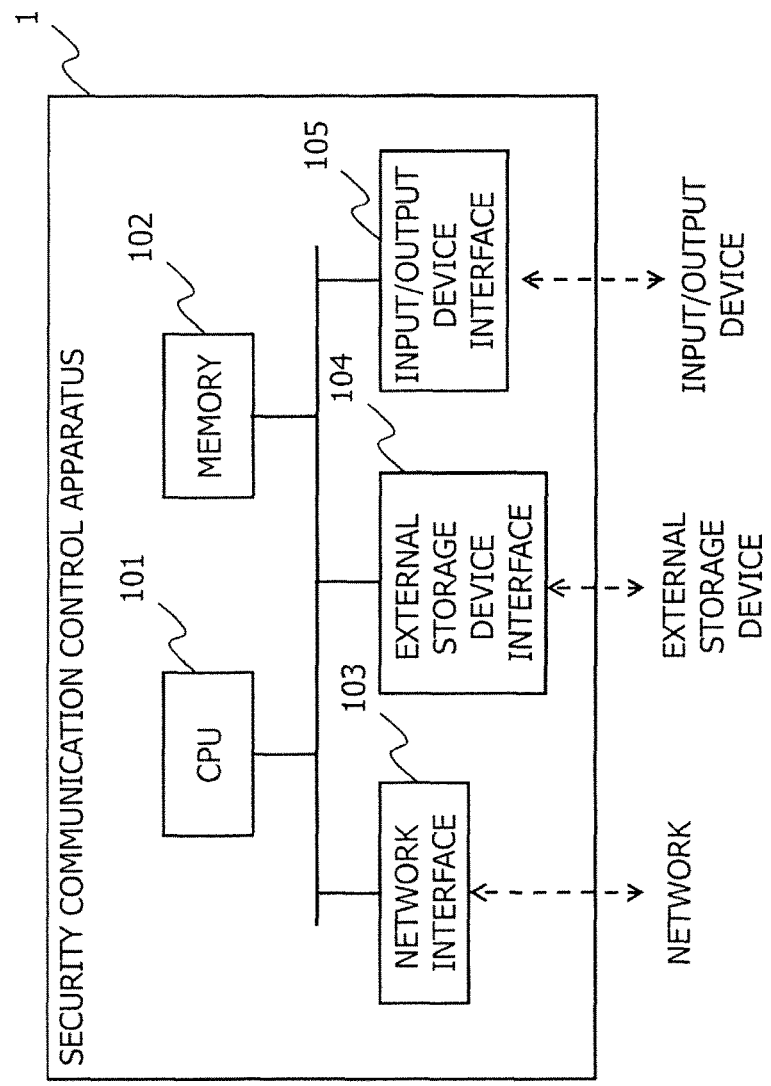
FIG. 4 is a diagram illustrating an example of hardware configuration of a security communication control apparatus.

FIG. 4 is a diagram illustrating an example of hardware configuration of the security communication control apparatus 1. The security communication control apparatus 1 is, for example, a special-purpose or general-purpose computer. The security communication control apparatus 1 includes a CPU (central processing unit) 101, a memory 102, a network interface 103, an external storage device interface 104 and an input/output device interface 105. The CPU 101, the memory 102, the network interface 103, the external storage device interface 104 and the input/output device interface 105 are electrically connected via a bus.

The memory 102 is a memory used as a main memory device. The memory 102 includes, for example, a RAM (random access memory) or a ROM (read only memory). The RAM is, for example, a semiconductor memory such as a DRAM (dynamic RAM), an SRAM (static RAM) or a SDRAM (synchronous DRAM). The memory 102 provides a work area for loading programs stored in a ROM or an external storage device to the CPU 101, and is used as a buffer.

The external storage device interface 104 is an interface with the external storage device. The external storage device is, for example, a non-volatile memory. The non-volatile memory is, for example, an EPROM (erasable programmable ROM) or a hard disk drive (hard disk drive). In the external storage device, for example, an OS (operating system), a secure communication control program and other application programs are stored. The secure communication control program is a program for setting or cancelling secure communication between the communication terminals 4. Here, the external storage device may be installed in the security communication control apparatus 1.

The CPU 101 loads the OS and the programs retained in the external storage device to the memory 102 and executes the OS and the programs, and thereby performs various processing. A plurality of the CPUs 101 may be provided. The CPU 101 is an example of "processor" of "communication control apparatus".

The network interface 103 is, for example, a circuit and a port to which a cable for a wired network channel such as an optical cable or a LAN (local area network) cable is connected.

The input/output device interface 105 is an interface between an input device and an output device. The input device is, for example, a keyboard or a pointing device such as a mouse. The output device is, for example, a display or a printer.

Here, the hardware configuration of the security communication control apparatus 1 illustrated in FIG. 4 is are mere examples, and the hardware configuration in the prevent embodiment are not limited to those described above, and arbitrary omissions, replacements and additions of components are possible depending on the embodiment. For example, the security communication control apparatus 1 may include a processor such as a DSP (digital signal processor) or a network processor in addition to the CPU 101.

The controller 2 is, for example, a special-purpose or general-purpose computer. The controller 2 includes, e.g., a CPU, a memory, a network interface, an input/output interface and an external storage device interface as hardware components. An overview of each of the hardware components is similar to that of the security communication control apparatus 1, and thus description thereof will be omitted. However, the controller 2 stores an OpenFlow controller program and a secure communication setting program in the external storage device. The OpenFlow controller program is a program for performing processing as an OpenFlow controller defined by OpenFlow. The secure communication setting program is a program for processing relating to setting of secure communication. The CPU in the controller 2 is an example of "processor" of "communication apparatus". The network interface in the controller 2 is an example of "transmitter" and "receiver" of "communication apparatus".

Each communication terminal 4 is, for example, a PC, a smartphone, a mobile phone terminal or a tablet terminal. The communication terminal 4 includes, e.g., a CPU, a memory, a network interface, an input/output device and an external storage device as hardware components. An overview of each of the hardware components is similar to that of the security communication control apparatus 1, and thus description thereof will be omitted. The communication terminal 4 stores a secure communication utilization program in the external storage device. The secure communication utilization program is a program for the communication terminal 4 to utilize secure communication as a source or a destination. The CPU in the communication terminal 4 is an example of "processor".

Figure 5:
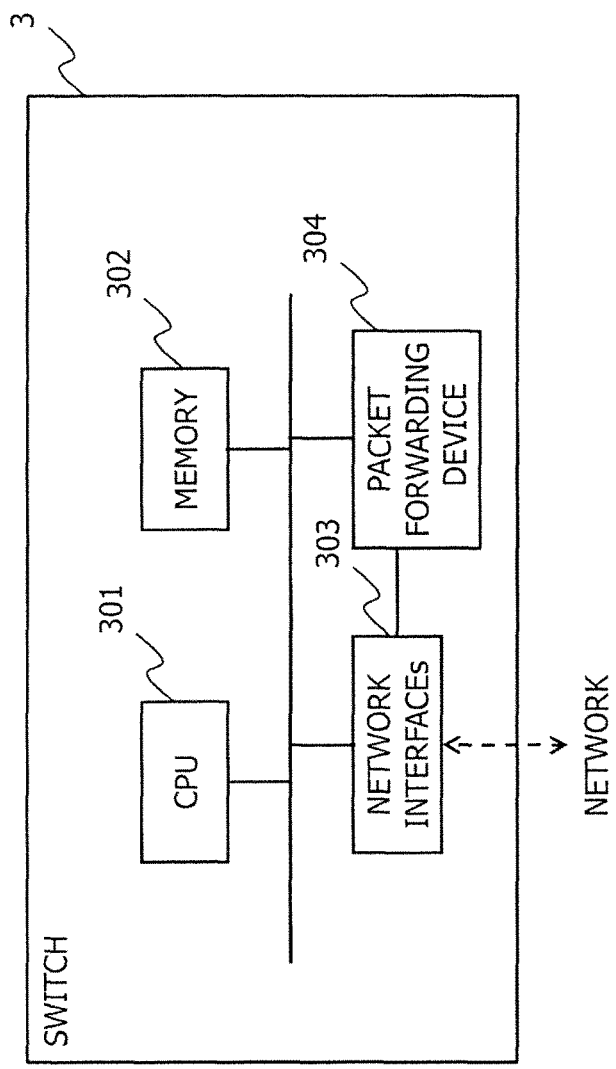
FIG. 5 is a diagram illustrating an example of hardware configuration of a switch.

FIG. 5 is a diagram illustrating an example of hardware configuration of a switch 3. The switch 3 is, for example, a SDN switch. The switch 3 includes, for example, a CPU 301, a memory 302, network interfaces 303 and a packet forwarding device 304. Description of the CPU 301, the memory 302 and the network interface 303 is similar to that of the CPU 101, the memory 102 and the network interface 103 in the security communication control apparatus 1 and thus is omitted. In the memory 302 of the switch 3, an OpenFlow switch program is stored. The OpenFlow switch program is a program for performing processing as an OpenFlow switch defined by OpenFlow.

The switch 3 includes a plurality of network interfaces 303. The packet forwarding device 304 is, for example, a switch circuit, and forwards packets between the plurality of network interfaces 303.

Here, the hardware configuration of the switch 3 illustrated in FIG. 5 are mere examples, and the hardware configuration of the switch 3 are not limited to those illustrated in FIG. 5. The CPU 301 in the switch 3 is an example of "processor" of "communication apparatus".

Figure 6:
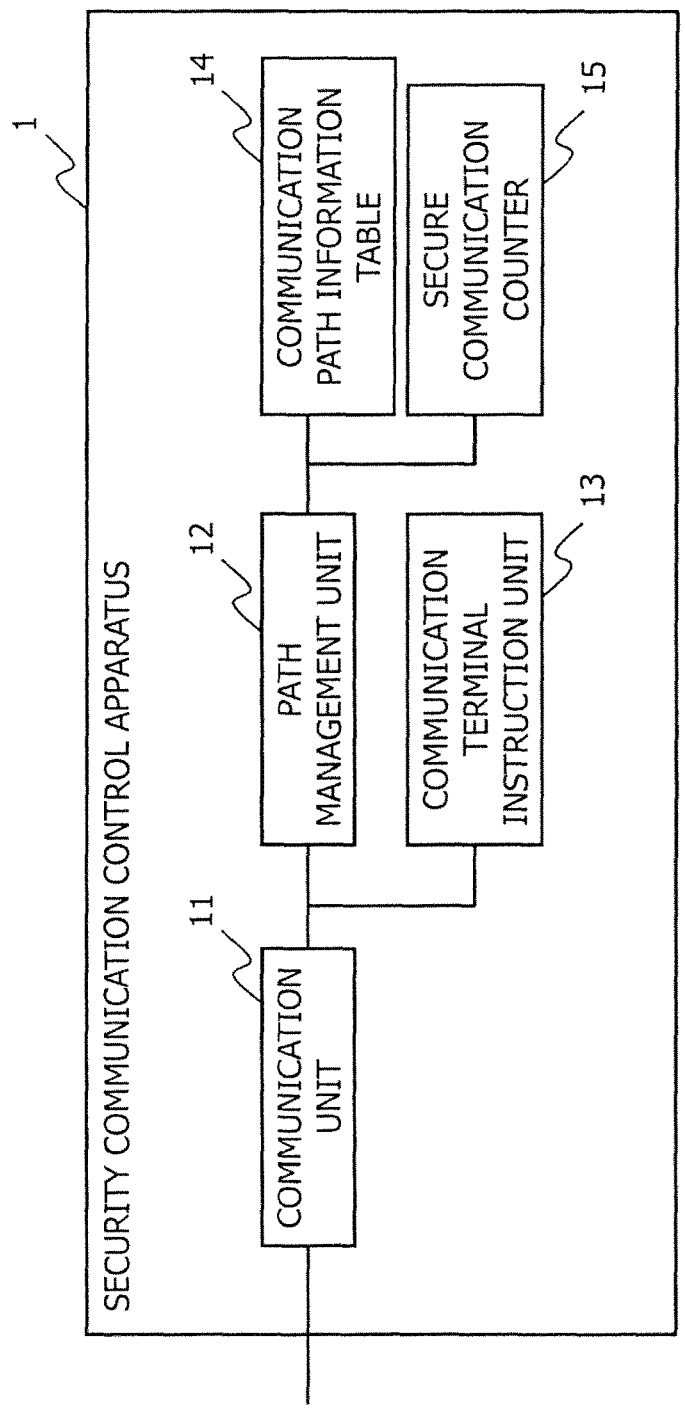
FIG. 6 is a diagram illustrating an example of functional configuration of the security communication control apparatus.

FIG. 6 is a diagram illustrating an example of functional configuration of the security communication control apparatus 1. The security communication control apparatus 1 includes a communication unit 11, a path management unit 12, a communication terminal instruction unit 13, a communication path information table 14 and a secure communication counter 15 as functional components. The communication unit 11 is a functional component corresponding to the network interface 103. The path management unit 12, the communication terminal instruction unit 13, the communication path information table 14 and the secure communication counter 15 are functional components that are provided as a result of the CPU 101 in the security communication control apparatus 1 executing the secure communication control program.

The path management unit 12 performs processing for establishing or release a secure communication path. More specifically, the path management unit 12 receives a secure communication establishment request from a communication terminal 4 through the communication unit 11. The secure communication establishment request is transmitted to the security communication control apparatus 1 from the communication terminal 4, which is a source of secure communication from which the request for secure communication has been issued. The secure communication establishment request includes, for example, information on the source communication terminal 4 and a destination communication terminal 4. The information on the source communication terminal 4 and the destination communication terminal 4 included in the secure communication establishment request is, for example, identification information of the source terminal and the destination terminal. The identification information of a communication terminal 4 is, for example, an IP address.

Upon reception of the secure communication establishment request, the path management unit 12 obtains information on a path from the source communication terminal 4 to the destination communication terminal 4 and transmits a secure communication setting request to the controller 2. The secure communication setting request includes a secure communication ID for identifying a secure communication, and information relating to packets in the secure communication. The secure communication ID is obtained by the path management unit 12 from the secure communication counter 15. Details of the information relating to packets in the secure communication included in the secure communication setting request will be described later. The secure communication establishment request is an example of "communication request".

The communication terminal instruction unit 13 transmits a secure communication setting request to the communication terminals 4 that are the source and the destination of the secure communication through the communication unit 11. The secure communication setting request transmitted to the communication terminals 4 is different from the secure communication setting request transmitted to the controller 2 in terms of information included therein.

The secure communication setting request transmitted to the communication terminals 4 includes, for example, a secure communication ID, identification information on the source and destination communication terminals 4 and a confirmation position and a dummy packet value in a header. The identification information of each of the communication terminals 4 is, for example, an IP address. The identification information of each of the communication terminals 4 is used for the destination communication terminal 4 to filter packets in the secure communication.

The path management unit 12 receives a notice of an end of the secure communication from the source communication terminal 4 through the communication unit 11. Upon reception of the notice of an end of the secure communication, the path management unit 12 transmits a secure communication release request to the controller 2. The secure communication release request includes a secure communication ID to be released. Also, the path management unit 12 instructs the communication terminal instruction unit 13 to transmit a secure communication release request to the destination communication terminal 4.

Also, upon reception of the notice of an end of the secure communication from the source communication terminal 4, the path management unit 12 updates a relevant entry in the communication path information table 14. The update of the communication path information table 14 upon receipt of the notice of an end of the secure communication will be described later. Upon an end of the update of the relevant entry in the communication path information table 14, the path management unit 12 notifies the source communication terminal 4 of an end of the secure communication release processing.

The secure communication counter 15 is a secure communication ID counter for identifying a secure communication. A value indicated by the secure communication counter 15 at the point of time of reception of a secure communication establishment request from a communication terminal 4 is a secure communication ID for the relevant secure communication. The counter value of the secure communication counter 15 is updated to a value incremented by one by the path management unit 12 each time the counter value is read by the path management unit 12.

FIG. 7 is a diagram illustrating an example of the communication path information table 14 in the security communication control apparatus 1. The communication path information table 14 is a table that stores information on paths between respective two base points in the communication system 100 and information relating to secure communication. The communication path information table 14 is stored in the memory 102. The communication path information table 14 is managed by the path management unit 12. An entry in the communication path information table 14 includes, for example, source terminal identification information, destination terminal identification information, a secure communication ID, identification information of a communication apparatus on a path, a confirmation position and a dummy value.

For the "source terminal" and the "destination terminal", for example, an IP address of the source or destination communication terminal 4 is used. Here, in FIG. 7, for sake of simplicity, for "source terminal" and "destination terminal", apparatus names are used instead of the IP addresses.

In the "secure communication ID", a value retained by the secure communication counter 15 at the time of reception of a secure communication establishment request for a relevant secure communication is stored. The secure communication IDs are set so as not to overlap one another in the communication system 100. In the first embodiment, a secure communication ID is assigned to a combination of source and destination communication terminals 4. Therefore, in the first embodiment, a source IP address and a destination IP address are used as flow identification information. Also, in the first embodiment, one secure communication is identified as one flow.

In the "communication apparatus 1", "communication apparatus 2", "communication apparatus 3", . . . , identification information pieces of communication apparatuses on a path are stored in the order of closeness to the source communication terminal 4. The path between the source communication terminal 4 and the destination communication terminal 4 may, for example, be registered in the communication path information table 14 in advance. Or, the path management unit 12 may obtain a path calculated by a routing function of the controller 2, from the controller 2 upon reception of a secure communication establishment request from a communication terminal 4.

For each of the identification information pieces of the communication apparatuses on the path, for example, any of an IP address, an apparatus name, etc., is used. In the example illustrated in FIG. 7, for sake of simplicity, an apparatus name is stored as identification information of each communication apparatus on the path. The apparatus name "OFSW" of a communication apparatus indicates a switch 3 that is an OpenFlow switch. The apparatus name "extNW" of a communication apparatus indicates an external network.

In the "confirmation position", information indicating a position of a bit string in a header of each packet in the relevant secure communication, the bit string being used for information indicating a position in the relevant payload where an original address is inserted, is included. A destination address field in a header has a size of 32 bits (4 bytes). For example, a "first byte of a destination address" being stored in the "confirmation position" indicates that for information indicating a position in the relevant payload where an original destination address is inserted, 8 bits of the first byte in the destination address field in the header are used. The "confirmation position" is randomly determined by the path management unit 12 upon reception of a secure communication establishment request for the relevant secure communication. In other words, the "confirmation position" is determined for each secure communication.

In the "dummy value", a value indicating a dummy packet, which is stored at a position in the relevant payload, the position being indicated by the "confirmation position", is stored. For the value indicating a dummy packet, for example, a same value determined in advance for the communication system 100 may be used through secure communications. Or, the value indicating a dummy packet may be determined by the path management unit 12 for each secure communication. In the example illustrated in FIG. 7, the value indicating a dummy packet is 0 (all of 32 bits are 0).

Upon reception of the notice of an end of the secure communication from the source communication terminal 4, values stored in the "secure communication ID", the "confirmation position" and the "dummy value" of the entry matching to the secure communication ID included in the notice of an end of the secure communication are deleted.

Figure 8:
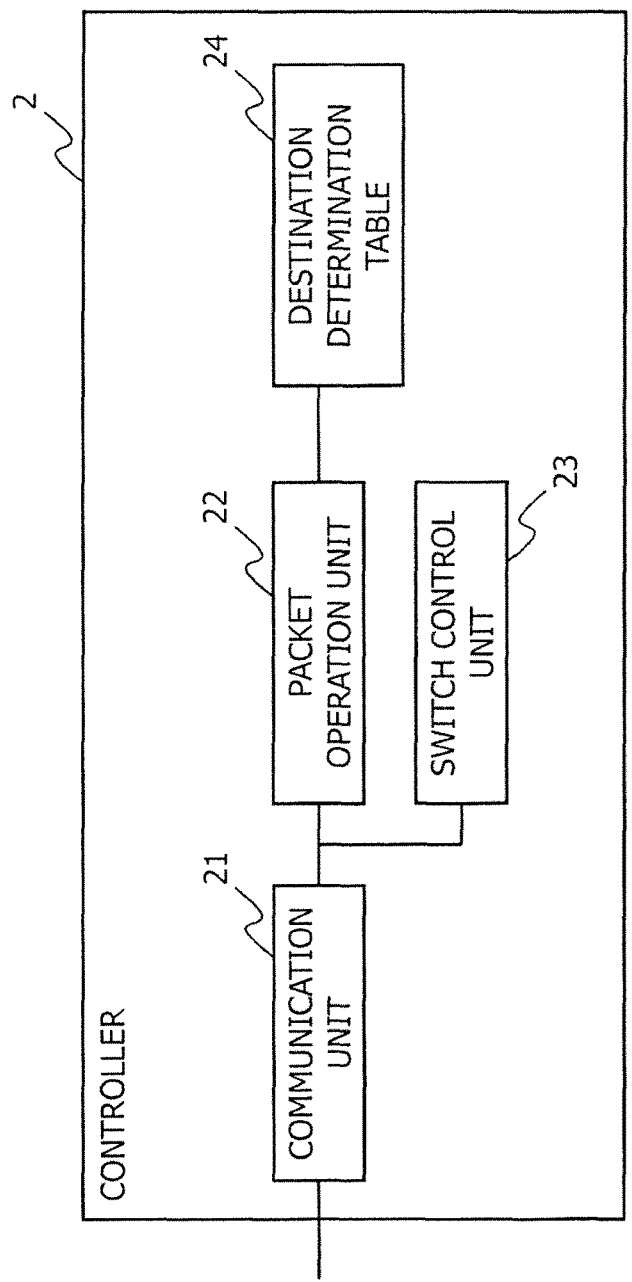
FIG. 8 is a diagram illustrating an example of functional configuration of a controller.

FIG. 8 is a diagram illustrating an example of functional configuration of the controller 2. The controller 2 includes a communication unit 21, a packet operation unit 22, a switch control unit 23 and a destination determination table 24 as functional components. The communication unit 21 is a functional component corresponding to a network interface. The packet operation unit 22 and the destination determination table 24 are functional components provided as a result of the CPU in the controller 2 executing the secure communication setting program stored in the external storage device. The communication unit 21 is an example of "transmitter" and "receiver" of "communication apparatus".

The packet operation unit 22 receives a secure communication setting request and a secure communication release request from the security communication control apparatus 1 through the communication unit 21. If the packet operation unit 22 receives a secure communication setting request, the packet operation unit 22 stores information included in the secure communication setting request into the destination determination table 24. Also, the packet operation unit 22 outputs the information included in the secure communication setting request to the switch control unit 23. If the packet operation unit 22 receives a secure communication release request, the packet operation unit 22 deletes an entry in the destination determination table 24, the entry matching a secure communication ID included in the secure communication release request, and transmits a response to the security communication control apparatus 1.

The destination determination table 24 stores the content of processing relating to packets in a secure communication. The destination determination table 24 is stored in the memory of the controller 2. The destination determination table 24 is managed by the packet operation unit 22. Details of the destination determination table 24 will be described later.

The switch control unit 23 is a functional component provided as a result of the CPU in the controller 2 executing the OpenFlow controller program stored in the external storage device. The switch control unit 23 sets an operation in reception of packets in a secure communication, for a relevant switch 3 based on the information included in the secure communication setting request input from the packet operation unit 22.

In OpenFlow, a switch 3 forwards packets according to a flow table. The flow table is a table in which a condition for processing object packets and the content of processing on packets meeting the condition are defined. By using a FlowMod message, the controller 2 can notify the switch 3 of an entry for the flow table and register the entry in the flow table. Also, in OpenFlow, there is a PacketIn message that enables the switch 3 to inquire the controller 2 about processing on a received packet or ask the controller 2 to perform processing on a received packet.

In the first embodiment, in packets in a secure communication, destination addresses in respective headers are rewritten with information that is different from an original address so as to have different values in a same flow. Thus, when a switch 3 relays the packets in the secure communication, the switch 3 is supposed to extract the original destination address from each payload because the switch 3 forwards the packets to the original destination address.

However, in an OpenFlow flow table, a command for designating a forwarding destination of a packet is provided, but no command for defining processing for extracting an original address from a payload of a packet is provided.

Therefore, in the first embodiment, the switch control unit 23 instructs a switch 3 to, when the switch 3 receives a secure communication packet, transmit a PacketIn message including the packet to the controller 2. More specifically, the switch control unit 23 transmits a flow entry in which a condition for a processing object packet is a secure communication packet and the content of processing on a packet meeting the condition is PacketIn message transmission, to the switch 3. The flow entry is transmitted by a FlowMod message. A PacketIn message can include a packet meeting the processing object condition for the flow entry in which the PacketIn message transmission instruction is provided. Therefore, the switch control unit 23 instructs the switch 3 to transmit a PacketIn message including a secure communication packet.

The PacketIn message including a secure communication packet from the switch 3 is received by the packet operation unit 22 through the communication unit 21. Upon reception of the PacketIn message including a secure communication packet, the packet operation unit 22 obtains a forwarding destination according to an original address in the packet based on the destination determination table 24. The packet operation unit 22 transmits a PacketOut message for providing an instruction to forward the packet to the obtained forwarding destination, to the switch 3. The PacketOut message is a response to the PacketIn message and is a message for instructing the switch 3 to output the packet. Also, the PacketOut message can include the packet to be output by the switch 3, and thus, the packet operation unit 22 makes the packet be included in the PacketOut message.

Also, upon reception of a secure communication release request, the switch control unit 23 transmits an instruction to cancel the setting for PacketIn message transmission relating to a security communication to be released, to each switch 3. The instruction to cancel the setting of PacketIn message transmission is transmitted by, for example, a FlowMod message.

FIG. 9 is an example of the destination determination table 24 in the controller 2. The destination determination table 24 stores the content of processing on secure communication packets. Each entry in the destination determination table 24 includes items such as secure communication ID, OpenFlow switch, source, forwarding destination, confirmation position, dummy value and operation type. The destination determination table 24 is searched using values in the OpenFlow switch and source items as keys.

In the "secure communication ID", a secure communication ID for a relevant secure communication for the entry is stored. In the "OpenFlow switch", identification information of a relevant switch 3 for the entry is stored. In the "source", identification information of a source terminal in the relevant secure communication for the entry is stored. In the "forwarding destination", identification information of an apparatus that is a destination of forwarding of packets in the relevant secure communication for the entry from the relevant switch 3 for the entry is stored. The identification information pieces of each of the switch 3 and the communication terminal 4 used in the destination determination table 24 may be any of an IP address, an apparatus name, etc. In the example illustrated in FIG. 9, apparatus names are used as the identification information pieces of the switch 3 and the communication terminal 4.

In the "confirmation position", information indicating a confirmation position in the header of each packet in the relevant secure communication for the entry is stored. In the "dummy value", a value indicating a dummy packet stored in the position indicated by the "confirmation position" in the payload is stored.

In the "operation type", a value indicating any of "relay", "transmission-side" and "reception-side" is stored. If the "operation type" is "relay", the packet operation unit 22 transmits a PacketOut message including information on a forwarding destination of a secure communication packet to a switch 3 that is a source of a PacketIn message that provides notification of the packet. The information on the forwarding destination of the packet provided by the PacketOut message is information stored in the "forwarding destination" in the destination determination table 24 for the secure communication packet provided by the PacketIn message.

If the "operation type" is "reception-side", the packet operation unit 22 performs the following processing on the packet provided by the PacketIn message. In this case, the packet included in the PacketIn message is a packet in the secure communication format. The packet operation unit 22 rewrites a destination address in the header of the packet included in the PacketIn message, with a destination address stored in the payload, and deletes the destination address stored in the payload. In other words, if the "operation type" is "reception-side", the packet operation unit 22 performs processing for converting the packet in the secure communication format to a packet in the normal format. The packet operation unit 22 transmits a PacketOut message including the packet converted into the normal format and information on the forwarding destination of the packet to the switch 3 that is the source of the PacketIn message.

If the "operation type" is "transmission-side", the packet operation unit 22 performs the following processing on the packet provided by the PacketIn message. In this case, the packet included in the PacketIn message is a packet in a normal communication format. The packet operation unit 22 calculates a random numbers for the packet included in the PacketIn message and stores the calculated random number in a destination address field of the header. Also, the packet operation unit 22 inserts an IP address stored in the destination address field of the header, into a position in the payload, the position corresponding to the value of the bit string at the confirmation position in the header.

In other words, if the "operation type" is "transmission-side", the packet operation unit 22 performs processing for converting the packet in the normal format into a packet in the secure communication format. The packet operation unit 22 transmits a PacketOut message including the packet converted into the secure communication format and the information on the forwarding destination of the packet, to the switch 3 that is the source of the PacketIn message.

Information to be stored in an entry in the destination determination table 24 is included in a secure communication setting request from the security communication control apparatus 1. In other words, in the first embodiment, information on secure communication packets included in a secure communication setting request from the security communication control apparatus 1 includes a secure communication ID, identification information of a switch 3, identification information of a source communication terminal 4, identification information of a forwarding destination apparatus, a confirmation position, dummy value and an operation type.

For example, in the entry in the first row of the destination determination table 24 in FIG. 9, the "OpenFlow switch" is switch #1, and the "source" is communication terminal #A. Therefore, the first row entry is an entry indicating processing in the controller 2 upon reception of a PacketIn message including a packet, a source of which is communication terminal #A, from switch #1.

In the first row entry, the "operation type" is "relay", and the "forwarding destination" is switch #2. Therefore, for a secure communication packet matching the first row entry, the packet operation unit 22 notifies switch #1 that is the source of the PacketIn message, of a PacketOut message that provides notification of switch #2 as a forwarding destination of the packet.

In the entry in the second row of the destination determination table 24 illustrated in FIG. 9, the "OpenFlow switch" is switch #2, and the "source" is communication terminal #A. Therefore, the second row entry is an entry indicating processing in the controller 2 upon reception of a PacketIn message including a packet, a source of which is communication terminal #A, from switch #2.

In the second row entry, the "operation type" is "reception-side", the "forwarding destination" is a destination address in the header, and the "confirmation position" is "first byte of the destination address". Therefore, the packet operation unit 22 obtains an original destination address from a position in the payload of the packet matching the second row entry, the position corresponding to a value of the first byte of the destination address in the header. The packet operation unit 22 rewrites the destination address field of the header of the packet with the original destination address obtained from the payload. Also, the packet operation unit 22 deletes the original address inserted in the payload.

Next, the packet operation unit 22 notifies switch #2, which is the source of the PacketIn message, of a PacketOut message including the destination address in the header of the converted packet as a forwarding destination of the converted packet, and the converted packet. Here, if a dummy value is stored at a position in the payload, the position being indicated at the confirmation position in the header of the packet provided by the PacketIn message, the packet is dropped.

In the third row entry in the destination determination table 24 illustrated in FIG. 9, the "OpenFlow switch" is switch #3, and the "source" is communication terminal #A. Therefore, the third row entry is an entry indicating processing in the controller 2 upon reception of a PacketIn message including packets, a source of which is communication terminal #A, from switch #3.

In the third row entry, the "operation type" is "transmission side", the "forwarding destination" is communication terminal #B, and the "confirmation position" is "first byte of the destination address". Therefore, the packet operation unit 22 stores a random number into the destination address field of the header of a packet matching the third row entry, and inserts an original destination address into a position in the payload, the position corresponding to a value of a bit string at the confirmation position in the first byte of the destination address in the header.

Next, the packet operation unit 22 notifies the switch #3, which is the source of the PacketIn message, of a PacketOut message including communication terminal #B as a forwarding destination of the converted packet and the converted packet. Also, the packet operation unit 22 generates dummy packets at a predetermined rate and notifies switch #3, which is the source of the PacketIn message, of PacketOut messages each including communication terminal #3 as a forwarding destination and a dummy packet.

Figure 10:
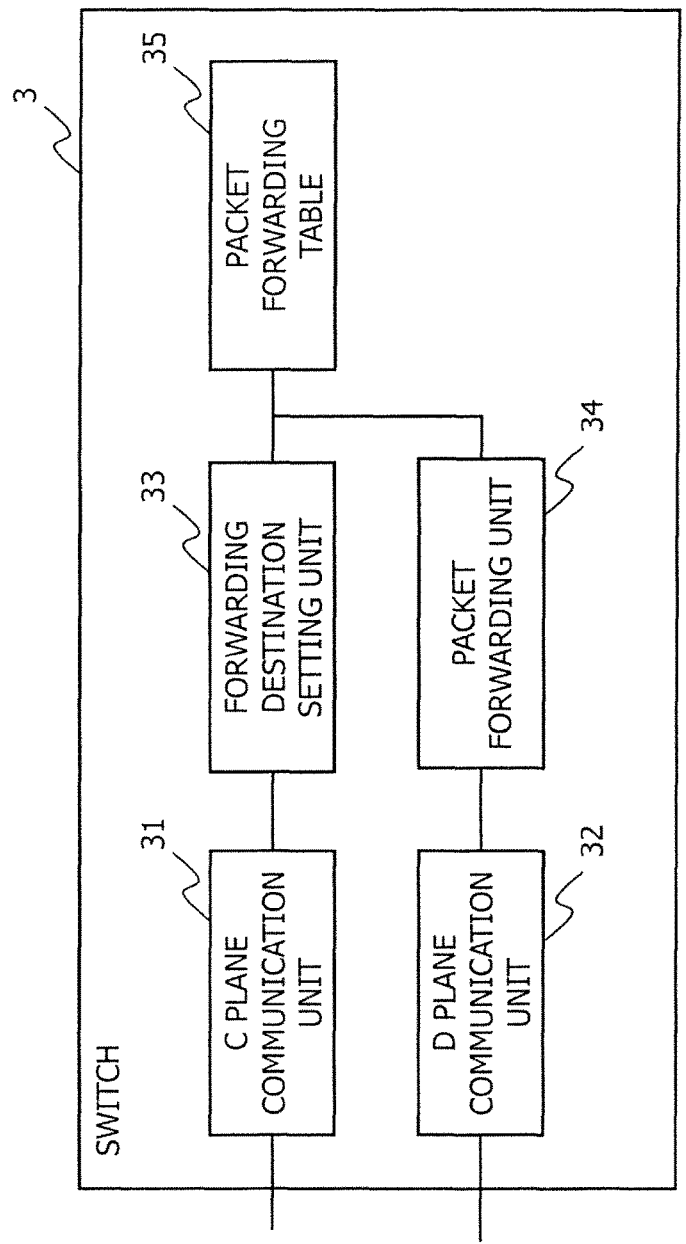
FIG. 10 is a diagram illustrating an example of functional configuration of a switch.

FIG. 10 is a diagram illustrating an example of functional configuration of a switch 3. The switch 3 includes a C plane communication unit 31, a D plane communication unit 32, a forwarding destination setting unit 33, a packet forwarding unit 34 and a packet forwarding table 35 as functional components. The C plane communication unit 31 and the D plane communication unit 32 correspond to the network interfaces 303. The C plane communication unit 31 is an interface for the control plane. The D plane communication unit 32 is an interface for the data plane.

The forwarding destination setting unit 33, the packet forwarding unit 34 and the packet forwarding table 35 are functional components provided as a result of the CPU 301 executing the OpenFlow switch program stored in the external storage device.

The forwarding destination setting unit 33 receives a FlowMod message and a PacketOut message from the controller 2 through the C plane communication unit 31. If a FlowMod message is received from the controller 2, the forwarding destination setting unit 33 registers a flow entry included in the FlowMod message, into a flow table (not illustrated). If a PacketOut message is received from the controller 2, the forwarding destination setting unit 33 outputs a packet, for which an output instruction is provided by the PacketOut message, and a forwarding destination of the packet, to the packet forwarding unit 34. If an instruction to delete a flow entry is included in a FlowMod message, the forwarding destination setting unit 33 deletes the relevant entry from the flow table.

Also, the forwarding destination setting unit 33 receives an input of an instruction to transmit a PacketIn message, from the packet forwarding unit 34. The forwarding destination setting unit 33 generates a PacketIn message according to the instruction from the packet forwarding unit 34, and transmits the PacketIn message to the controller 2 through the C plane communication unit 31. In the first embodiment, it is assumed that a PacketIn message includes a packet that is a trigger of transmission of the PacketIn message.

The packet forwarding unit 34 receives a packet flowing on the data plane through the D plane communication unit 32. The packet forwarding unit 34 obtains a forwarding destination of the received packet from the flow table, and outputs the packet from an interface according to the forwarding destination. In the flow table, if PacketIn message transmission is set, the packet forwarding unit 34 instructs the forwarding destination setting unit 33 to transmit a PacketIn message.

FIG. 11 is an example of a packet forwarding table 35 for a switch 3. The packet forwarding table 35 is a table that retains information on forwarding destinations of secure communication packets. In the first embodiment, the packet forwarding table 35 holds flow entries relating to secure communication from among flow entries included in the flow table. In other words, in the first embodiment, the packet forwarding table 35 is a part of the flow table. The packet forwarding table 35 is stored in the memory 302 of the switch 3. The packet forwarding table 35 is managed by the forwarding destination setting unit 33.

An entry in the packet forwarding table 35 includes items that are a source, a destination and a forwarding destination. Respective pieces of identification information of a source apparatus, a destination apparatus and a forwarding destination apparatus are stored. For the identification information of each apparatus, an IP address is used. In FIG. 11, for sake of simplicity, as identification information of each apparatus, the apparatus name is used. If a PacketIn message is transmitted to the controller 2, the forwarding destination is the controller 2.

In the first embodiment, the packet forwarding table 35 is a part of the flow table. Thus, in an entry in the packet forwarding table 35, the items "source" and "destination" correspond to conditions for a processing object packet. The item "forwarding destination" corresponds to processing on a packet meeting the conditions.

Figure 12:
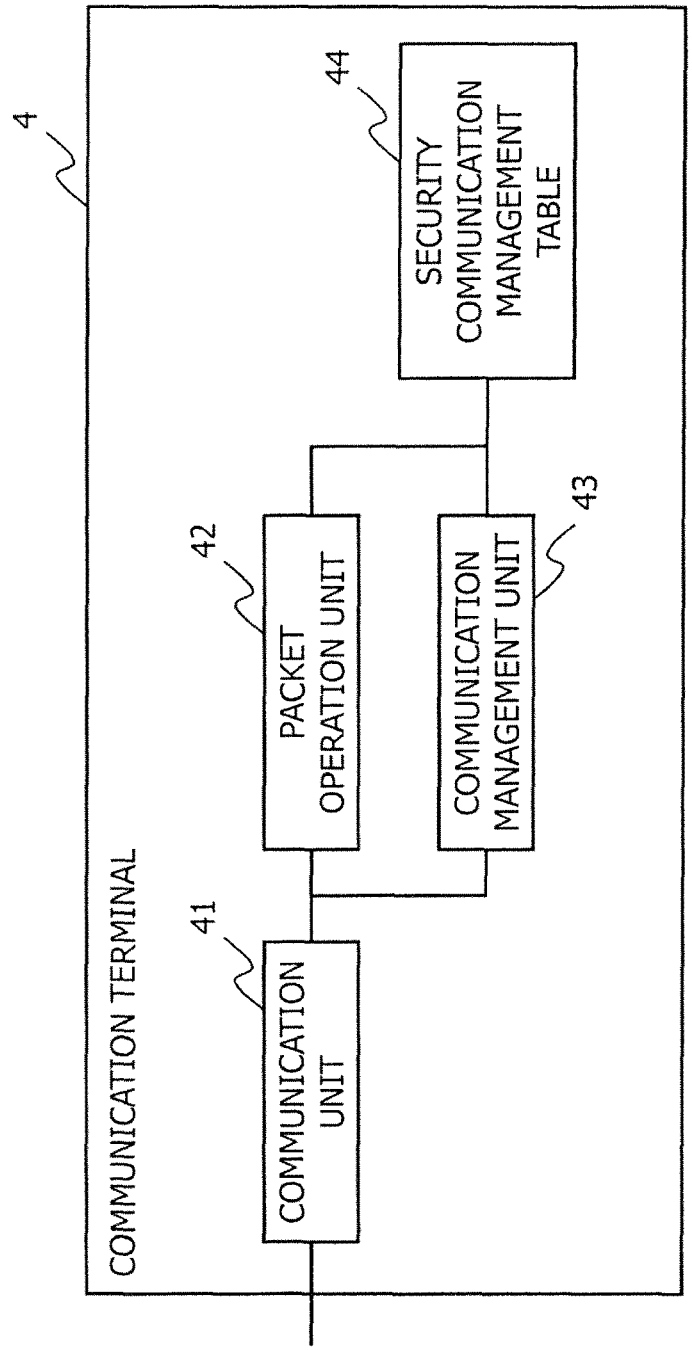
FIG. 12 is a diagram illustrating an example of functional configuration of a communication terminal.

FIG. 12 is a diagram illustrating an example of functional configuration of a communication terminal 4. The communication terminal 4 includes a communication unit 41, a packet operation unit 42, a communication management unit 43 and a security communication management table 44 as functional components. The communication unit 41 corresponds to a network interface. The packet operation unit 42, the communication management unit 43 and the security communication management table 44 are functional components provided as a result of the CPU executing the secure communication utilization program stored in the external storage device.

The communication management unit 43 performs transmission/reception to/from the security communication control apparatus 1 through the communication unit 41. If the communication terminal 4 is a source, for example, the communication management unit 43 receives a secure communication request from an application and transmits a secure communication establishment request to the security communication control apparatus 1. The secure communication establishment request includes identification information of the relevant communication terminal 4 as a source and identification information of a destination communication terminal 4.

Also, if the communication terminal 4 is a source, for example, the communication management unit 43 receives an end of a secure communication from an application, and notifies the security communication control apparatus 1 of the end of the secure communication. The notification of the end of the secure communication includes a secure communication ID.

Regardless of whether the communication terminal 4 is a source or a destination, the communication management unit 43 receives a secure communication setting request and a secure communication release request from the security communication control apparatus 1 through the communication unit 41. The secure communication setting request includes a secure communication ID, identification information of a source and a destination, a confirmation position and a dummy value. The communication management unit 43 registers the information included in the received secure communication setting request into the security communication management table 44. The secure communication release request includes a secure communication ID. Upon reception of the secure communication release request, the communication management unit 43 deletes an entry corresponding to the relevant secure communication ID in the security communication management table 44.

The packet operation unit 42 performs packet transmission processing or reception processing. In a secure communication, if the communication terminal 4 operates as a source, the packet operation unit 42 calculates a random number, and stores the calculated random number into the destination address field of the header. Also, the packet operation unit 22 inserts an original destination address stored in the destination field of the header into a position in the payload, the position corresponding to a value of a bit string at a confirmation position in the header. The confirmation position in the header is obtained from the security communication management table 44. The packet operation unit 42 transmits the packet converted into the secure communication format to the destination communication terminal 4 through the communication unit 41.

In a secure communication, if the communication terminal 4 operates as a destination, the packet operation unit 42 receives a packet in the secure communication format through the communication unit 41. If a packet whose source address is registered in the security communication management table 44 is received, the packet operation unit 42 obtains data from the received packet in the secure communication format and outputs the data to an application. More specifically, the packet operation unit 42 outputs data obtained by deleting the header and deleting an original destination address from a position in the payload, the position corresponding to a value of a bit string at a confirmation position in the header of the packet, to the application. The confirmation position in the header is obtained from the security communication management table 44.

FIG. 13 is an example of the security communication management table 44. The security communication management table 44 is a table that retains information relating to secure communications performed by the communication terminal 4. The security communication management table 44 is stored in the memory of the communication terminal 4. The security communication management table 44 is managed by the communication management unit 43.

An entry in the security communication management table 44 includes items that are secure communication ID, source, destination, confirmation position and dummy value. In the "source" and "destination", respective pieces of identification information of source and destination communication terminals 4 are stored. If the communication terminal 4 is a source, identification information of the own apparatus may be stored in the "source" or the "source" may be blank. If the communication terminal 4 is a destination, the identification information of the own apparatus may be stored in the "destination" or the "destination" may be blank.

Values of the items, secure communication ID, source, destination, confirmation position and dummy value in an entry in the security communication management table 44 are included in a secure communication setting request from the security communication control apparatus 1.

<Flow of Processing>

Each of FIGS. 14A, 14B, 14C and 14D is an example of a flowchart of processing in the path management unit 12 in the security communication control apparatus 1. The processing indicated in FIGS. 14A to 14D is started upon the security communication control apparatus 1 receiving a communication from a communication terminal 4. Although an entity that performs the processing indicated in FIGS. 14A to 14D is the CPU 101 that executes the secure communication control program, for sake of simplicity, the description will be provided with the path management unit 12, which is a functional component, as the entity.

In OP1, the path management unit 12 receives a communication from a communication terminal 4 through the communication unit 11. In OP2, the path management unit 12 analyzes the content of the communication received from the communication terminal 4. If the content of the communication from the communication terminal 4 is a secure communication establishment request (OP2: establishment request), the processing proceeds to OP3. If the content of the communication from the communication terminal 4 is a notice of an end of a secure communication (OP2: end notice), the processing proceeds to OP21 in FIG. 14D.

Figure 14B:
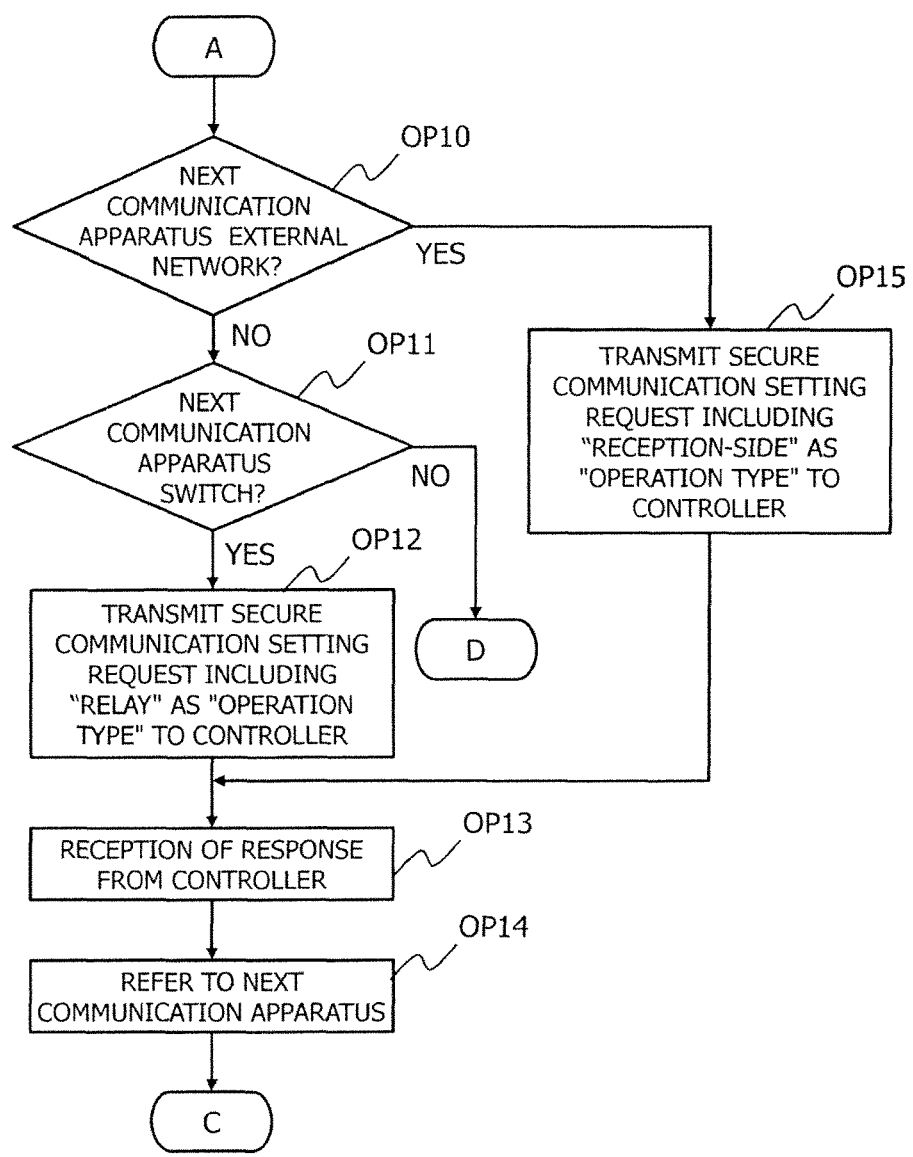
FIG. 14B is an example of a flowchart of processing in the path management unit in the security communication control apparatus.
Figure 14C:
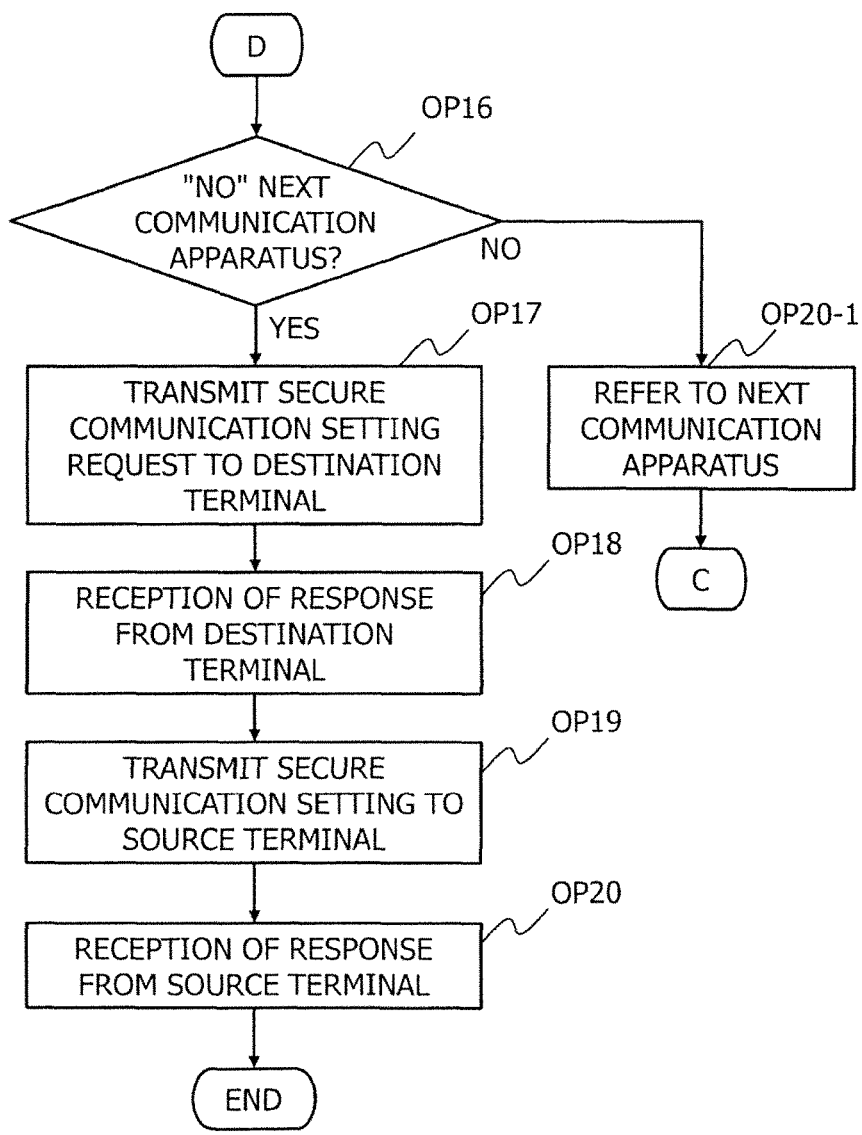
FIG. 14C is an example of a flowchart of processing in the path management unit in the security communication control apparatus.

Each of the processing from OP3 to OP9 in FIG. 14A, the processing in FIG. 14B and the processing in FIG. 14C is processing upon reception of a secure communication establishment request from a communication terminal 4. In OP3, the path management unit 12 updates the communication path information table 14.

More specifically, the path management unit 12 searches the communication path information table 14 using identification information pieces of source and destination communication terminals 4 included in the secure communication establishment request as keys. The path management unit 12 detects an entry matching the identification information pieces of the source and destination communication terminals 4 included in the secure communication establishment request, obtains a secure communication ID from the secure communication counter 15 and stores the secure communication ID in the "communication ID" of the detected entry (see FIG. 7). Also, the path management unit 12 determines a value for the "confirmation position" in the detected entry in the communication path information table 14 and stores the value in the "confirmation position". Also, the path management unit 12 stores a predetermined value into the "dummy value" of the detected entry in the communication path information table 14.

In OP4, the path management unit 12 refers to a value in the "communication apparatus 1" of the detected entry in the communication path information table 14.

In OP5, the path management unit 12 determines whether or not a value in the "communication apparatus N" of the detected entry in the communication path information table 14 is a value indicating an external network. N is a variable number whose initial value is 1, the variable number being incremented one by one. If the value in the "communication apparatus N" is a value indicating an external network (OP5: YES), the processing proceeds to OP6. If the value in the "communication apparatus N" is not a value indicating an external network (OP5: NO), the processing proceeds to OP7.

In OP6, since the value in the "communication apparatus N" is a value indicating an external network, the path management unit 12 refers to a value in the next "communication apparatus" in the detected entry in the communication path information table 14. The variable number N is updated to a value incremented by one. Subsequently, the processing proceeds to OP5.

In OP7, since the value in "communication apparatus N" is not a value indicating an external network, the path management unit 12 determines whether or not a value in the preceding "communication apparatus N−1" of the detected entry in the communication path information table 14 is a value indicating an external network. If a value in the preceding "communication apparatus N−1" is a value indicating an external network (OP7: YES), the processing proceeds to OP8. If the value in the preceding "communication apparatus N−1" is not a value indicating an external network (OP7: NO), the processing proceeds to OP10 in FIG. 14B.

In OP8, the path management unit 12 determines that the "operation type" of the "communication apparatus N" is "transmission-side", and transmits a secure communication setting request including "transmission-side" as the "operation type", to the controller 2. The secure communication setting request transmitted in OP8 includes a secure communication ID, identification information of a relevant switch 3, identification information of the source communication terminal 4, identification information of a forwarding destination apparatus, a confirmation position in a header, a dummy value, and the operation type of "transmission-side". The secure communication ID, the identification information of the relevant switch 3, the identification information of the source communication terminal 4, the identification information of the forwarding destination apparatus, the confirmation position in the header and the dummy value included in the secure communication setting request are values stored in the items, the "communication ID", the "communication apparatus N", the "communication apparatus N+1", the "confirmation position" and the "dummy value" of the detected entry in the communication path information table 14.

In other words, the processing in OP8 means that the path management unit 12 instructs the controller 2 to: (1) obtain a PacketIn message for each of all packets in the secure communication from the relevant switch 3; (2), as a transmission-side apparatus, convert each packet in the normal format into the secure communication format; and (3) transmits the converted packet and the information of the forwarding destination to the switch 3, by means of a PacketOut message.

In OP9, the path management unit 12 receives a response from the controller 2. Subsequently, the processing proceeds to OP16 in FIG. 14C.

In OP10 in FIG. 14B, the path management unit 12 determines whether or not the value in the next "communication apparatus N+1" of the detected entry in the communication path information table 14 is a value indicating an external network. If the value in the "communication apparatus N+1" is a value indicating an external network (OP10: YES), the processing proceeds to OP15. If the value in the "communication apparatus N+1" is not a value indicating an external network (OP10: NO), the processing proceeds to OP11.

In OP11, the path management unit 12 determines if the value in the "communication apparatus N+1" in the detected entry in the communication path information table 14 is a switch 3. If the value in the "communication apparatus N+1" is a switch 3 (OP11: YES), the processing proceeds to OP12. If the value in the "communication apparatus N+1" is not a switch 3, in other words, no value is stored in the "communication apparatus N+1" (OP11: NO), the processing proceeds to OP16 in FIG. 14C.

In OP12, the path management unit 12 determines that the "operation type" of the apparatus in the "communication apparatus N" is "relay", and transmits a secure communication setting request including "relay" as the "operation type", to the controller 2. The secure communication setting request transmitted in OP12 includes a secure communication ID, identification information of the relevant switch 3, identification information of the source communication terminal 4, identification information of a forwarding destination apparatus, the confirmation position in the header, the dummy value and the operation type of "relay".

In other words, the processing in OP12 means that the path management unit 12 instructs the controller 2 to: (1) obtain a PacketIn message for each of all of packets in the relevant secure communication from the relevant switch 3; and (2) transmits the forwarding destination information to the switch 3 by means of a PacketOut message.

In OP13, the path management unit 12 receives a response to the secure communication setting request transmitted in OP12, from the controller 2. In OP14, the path management unit 12 refers to a value in the next "communication apparatus" of the detected entry in the communication path information table 14. The variable number N is updated to a value incremented by one. Subsequently, the processing proceeds to OP5 in FIG. 14A.

In OP15, the path management unit 12 determines that the "operation type" of the apparatus in the "communication apparatus N" is "reception-side", and transmits a secure communication setting request including "reception-side" as the "operation type", to the controller 2. The secure communication setting request transmitted in OP15 includes the secure communication ID, the identification information of the relevant switch 3, the identification information of the source communication terminal 4, identification information of a forwarding destination apparatus, the confirmation position in the header, the dummy value and the operation type of "reception-side".

In other words, the processing in OP15 means that the path management unit 12 instructs the controller 2 to: (1) obtain a PacketIn message for each of all of packets in the relevant secure communication from the relevant switch 3; (2) as a reception-side apparatus, convert each packet in the relevant secure communication format into a normal format; and (3) transmit the converted packet and the forwarding destination information to the switch 3 by means of a PacketOut message. Subsequently, the processing proceeds to OP13.

In OP16 in FIG. 14C, the path management unit 12 determines whether or not a value is stored in the "communication apparatus N+1" of the detected entry in the communication path information table 14. If no value is stored in the "communication apparatus N+1" (OP16: YES), the processing proceeds to OP17. If a value is stored in the "communication apparatus N+1" (OP16: NO), the processing proceeds to OP20-1. For example, the case in which the value in the "communication apparatus N−1" is an external network and the value in the "communication apparatus N+1" is a switch 3 corresponds to NO in OP16, and the processing proceeds to OP20-1.

In OP17, the path management unit 12 instructs the communication terminal instruction unit 13 to transmit a secure communication setting request to the destination communication terminal 4. Upon reception of the instruction from the path management unit 12, the communication terminal instruction unit 13 transmits a secure communication setting request to the destination communication terminal 4. The secure communication setting request transmitted to the communication terminal 4 includes values in the items, "source", "destination", "secure communication ID", "confirmation position" and "dummy value" of the detected entry in the communication path information table 14.

In OP18, the path management unit 12 receives a response to the secure communication setting request transmitted in OP15, from the destination communication terminal 4.

In OP19, the path management unit 12 instructs the communication terminal instruction unit 13 to transmit a secure communication setting request to the source communication terminal 4. The secure communication setting request transmitted to the communication terminal 4 is the same as that transmitted in OP17.

In OP20, the path management unit 12 receives a response to the secure communication setting request transmitted in OP19, from the source communication terminal 4. Subsequently, the processing indicated in FIG. 14C ends.

In OP20-1, the path management unit 12 refers to a value in the next "communication apparatus" of the detected entry in the communication path information table 14. The variable N is updated to a value incremented by one. Subsequently, the processing proceeds to OP5 in FIG. 14A.

Figure 14D:
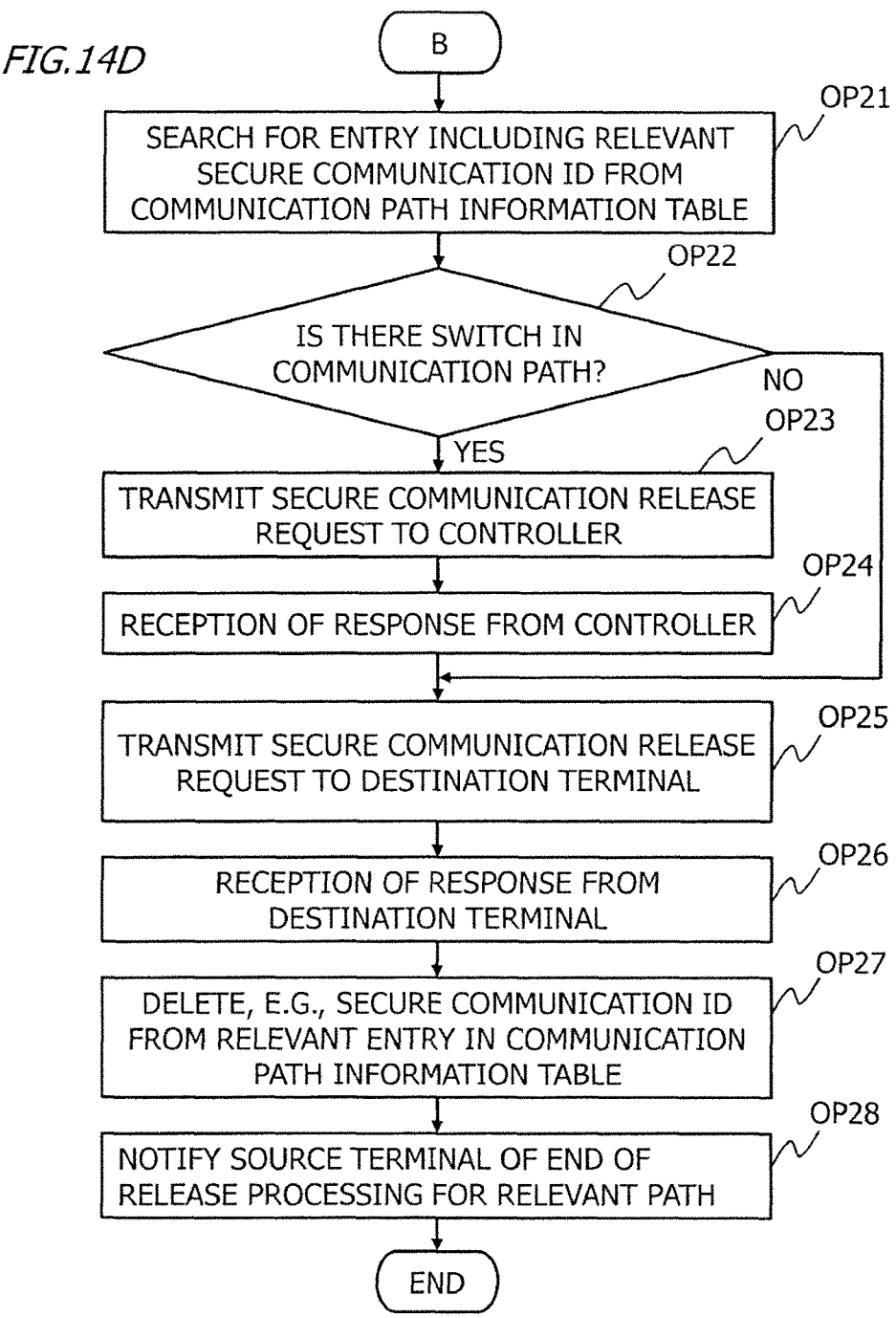
FIG. 14D is an example of a flowchart of processing in the path management unit in the security communication control apparatus.

The processing indicated in FIG. 14D is processing if a communication from a communication terminal 4 is a notice of an end of a secure communication. In OP21, the path management unit 12 searches for an entry corresponding to a secure communication ID included in the notice of an end of a secure communication, from the communication path information table 14.

In OP22, the path management unit 12 determines whether or not there is a switch 3 on the path, based on the detected entry detected in OP21 in the communication path information table 14. If there is a switch 3 on the path (OP22: YES), the processing proceeds to OP23. If there is no switch 3 on the path (OP22: NO), the processing proceeds to OP25.

In OP23, the path management unit 12 transmits a secure communication release request to the controller 2. The secure communication release request includes the secure communication ID included in the notice of an end of a secure communication.

In OP24, the path management unit 12 receives a response to the secure communication release request transmitted in OP23, from the controller 2.

In OP25, the path management unit 12 instructs the communication terminal instruction unit 13 to transmit a secure communication release request to a destination communication terminal 4. The communication terminal instruction unit 13 transmits a secure communication release request to the destination communication terminal 4, according to the instruction from the path management unit 12. The secure communication release request includes the secure communication ID included in the notice of an end of a secure communication.

In OP26, the path management unit 12 receives a response to the secure communication release request transmitted in OP25, from the destination communication terminal 4.

In OP27, the path management unit 12 deletes values stored in the "secure communication ID", the "confirmation position" and the "dummy value" of the entry detected in OP21 in the communication path information table 14.

In OP28, the path management unit 12 instructs the communication terminal instruction unit 13 to transmit a notice of an end of secure communication releasing processing to the source communication terminal 4. The communication terminal instruction unit 13 transmits a notice of an end of secure communication releasing processing to the source communication terminal 4 according to the instruction from the path management unit 12. Subsequently, the processing indicated in FIG. 14D ends.

Figure 15A:
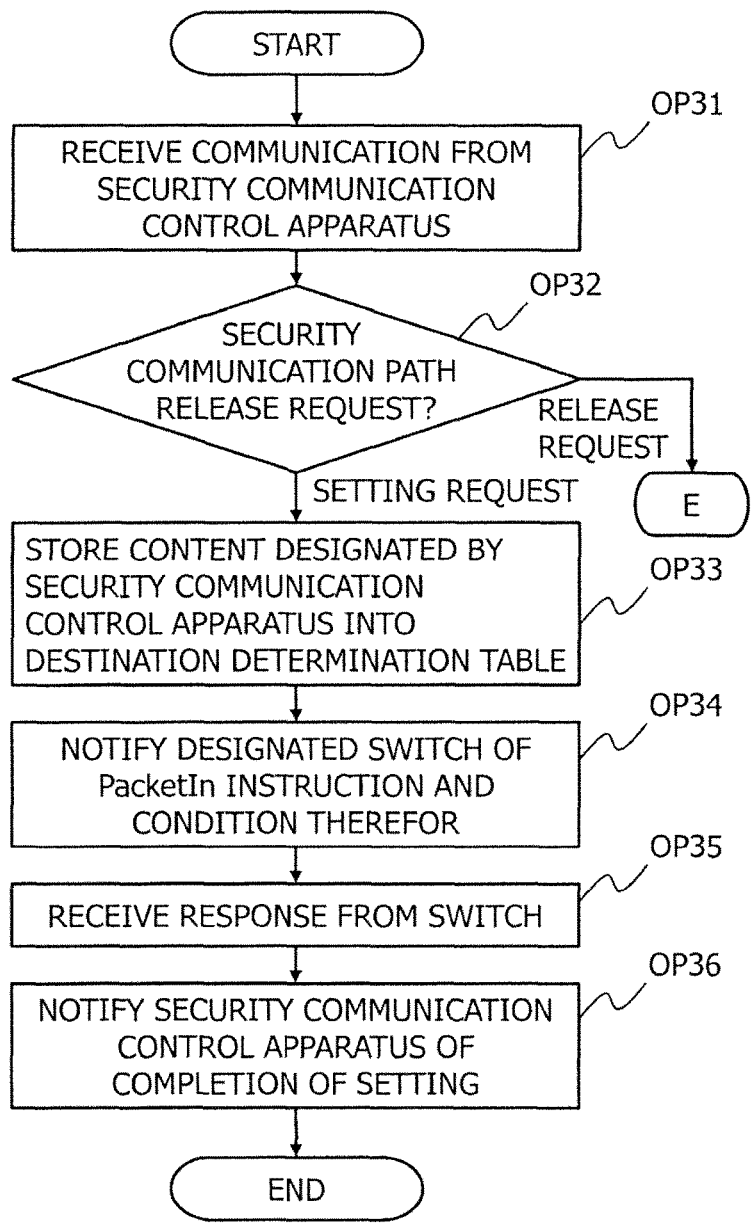
FIG. 15A is an example of a flowchart of processing in a packet operation unit in the controller upon reception of a communication from the security communication control apparatus.
Figure 15B:
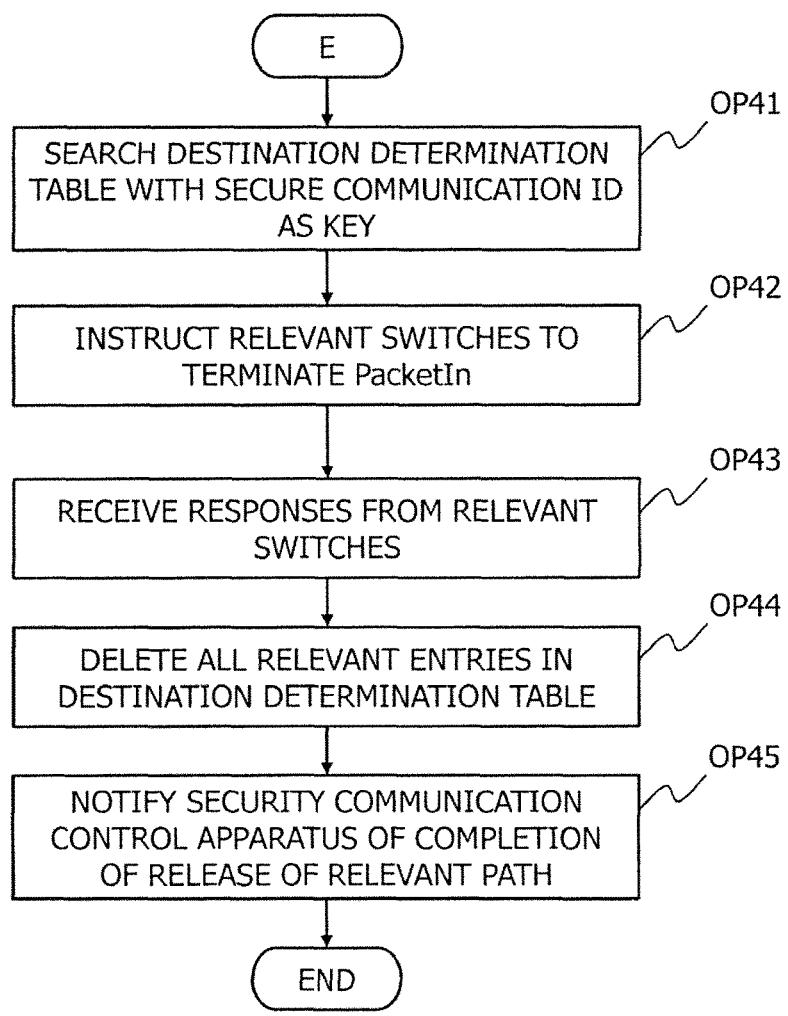
FIG. 15B is an example of a flowchart of processing in the packet operation unit in the controller upon reception of a communication from a security communication control apparatus.

Each of FIGS. 15A and 15B is an example of a flowchart of processing in the packet operation unit 22 of the controller 2 upon reception of a communication from the security communication control apparatus 1. The processing indicated in FIGS. 15A and 15B is started upon the controller 2 receiving a communication from the security communication control apparatus 1. Although an entity that performs the processing indicated in FIGS. 15A and 15B is the CPU of the controller 2, the CPU executing the secure communication setting program, for sake of simplicity, the description will be provided with the packet operation unit 22, which is a functional component, as the entity.

In OP31, the packet operation unit 22 receives a communication from the security communication control apparatus 1.

In OP32, the packet operation unit 22 analyzes the content of the communication from the security communication control apparatus 1. If the content of the communication from the security communication control apparatus 1 is a secure communication setting request (OP32: setting request), the processing proceeds to OP33. If the content of the communication from the security communication control apparatus is a secure communication release request (OP32: release request), the processing proceeds to OP41 in FIG. 15B.

The processing in OP33 to OP36 is processing upon reception of a secure communication setting request from the security communication control apparatus 1. In OP33, the packet operation unit 22 registers information included in the secure communication setting request, into the destination determination table 24. The secure communication setting request includes a secure communication ID, an OpenFlow switch, a source, a forwarding destination, a confirmation position, a dummy value and an operation type, which are items of an entry in the destination determination table 24.

In OP34, the packet operation unit 22 instructs the switch 3 designated by the secure communication setting request, to transmit a PacketIn message for each of packets from the source designated by the secure communication setting request. In the first embodiment, in OP34, a FlowMod message is used. The FlowMod message includes a flow entry and an instruction to register the flow entry. The flow entry includes identification information of the source communication terminal 4 designated by the secure communication setting request as a condition for a processing object packet and PacketIn message transmission as processing on a packet meeting the condition.

In OP35, the packet operation unit 22 receives a response to the instruction transmitted in OP34, from the switch 3.

In OP36, the packet operation unit 22 notifies the security communication control apparatus 1 of completion of setting as a response to the secure communication setting request. Subsequently, the processing indicated in FIG. 15A ends.

The processing from OP41 to OP45 in FIG. 15B is processing upon the controller 2 receiving a secure communication release request from the security communication control apparatus 1. In OP41, the packet operation unit 22 searches the destination determination table 24 with a secure communication ID included in the secure communication release request as a key.

In OP42, the packet operation unit 22 instructs respective switches 3 included in entries in the destination determination table 24, the entries corresponding to the secure communication ID included in the secure communication release request, to terminate PacketIn message transmission processing. In the first embodiment, a FlowMod message including a flow entry that is the same in content as that of the FlowMod message transmitted in OP34 and an instruction to delete the flow entry are transmitted.

In OP43, the packet operation unit 22 receives a response to the instruction transmitted in OP42, from each switch 3.

In OP44, the packet operation unit 22 deletes all of the entries matching the secure communication ID included in the secure communication release request, from the destination determination table 24.

In OP45, the packet operation unit 22 notifies the security communication control apparatus 1 of completion of release, as a response to the secure communication release request. Subsequently, the processing indicated in FIG. 15B ends.

Figure 16B:
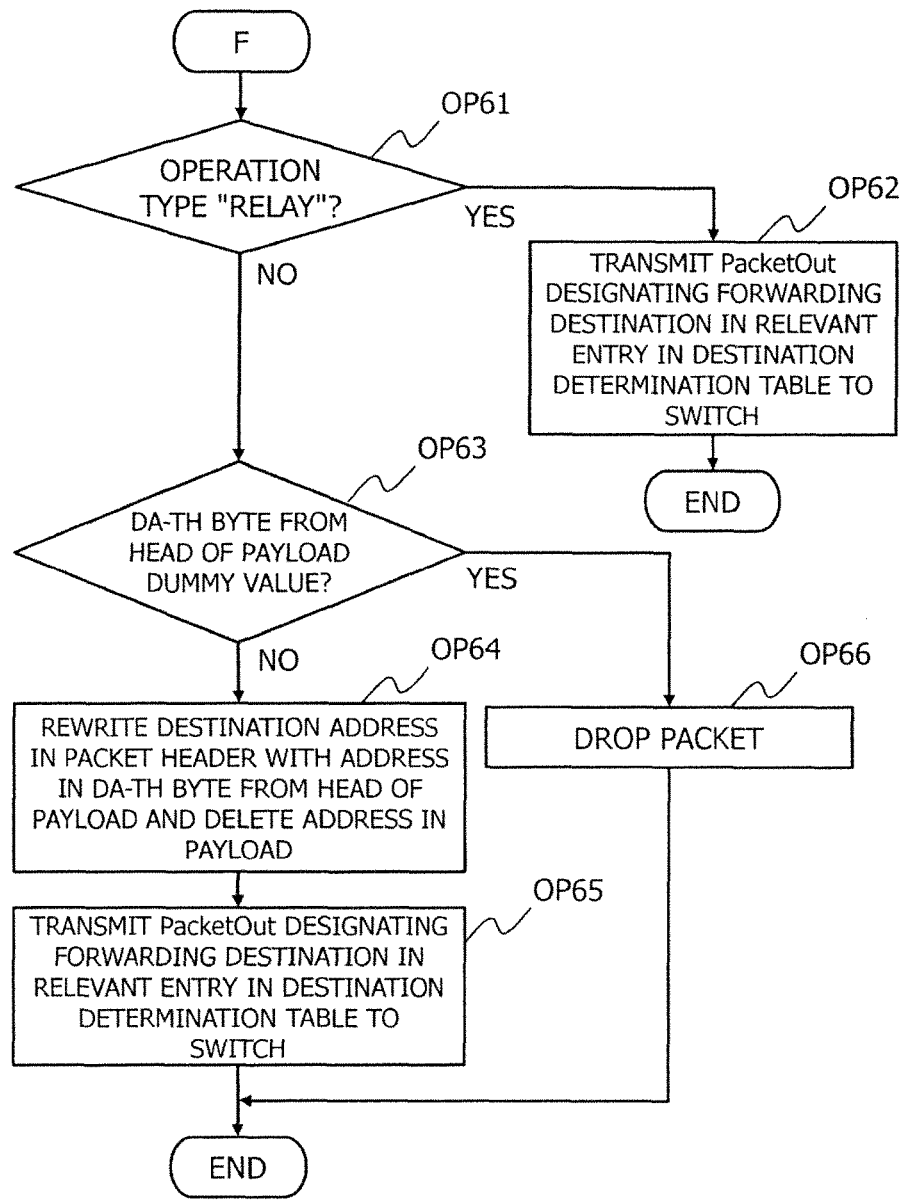
FIG. 16B is an example of a flowchart of processing in the packet operation unit in the controller upon reception of a PacketIn message from a switch.

Each of FIGS. 16A and 16B is an example of a flowchart of processing in the packet operation unit 22 of the controller 2 upon reception of a PacketIn message from a switch 3. The processing indicated in FIGS. 16A and 16B is started upon the controller 2 receiving a PacketIn message from a switch 3. As in FIGS. 15A and 15, FIGS. 16A and 16B are indicated with the packet operation unit 22, which is a functional component, as an entity.

In OP51, the packet operation unit 22 receives a PacketIn message from a switch 3.

In OP52, the packet operation unit 22 searches the destination determination table 24 with identification information of the switch 3 that is the source of the PacketIn message, and a source IP address of a packet included in the PacketIn message as keys.

In OP53, the packet operation unit 22 determines whether or not the "operation type" of an entry in the destination determination table 24, the entry being detected in OP52, is "transmission-side". If the "operation type" is "transmission-side" (OP53: YES), the processing proceeds to OP54. If the "operation type" is not "transmission-side" (OP53: NO), the processing proceeds to OP61 in FIG. 16B.

The processing in OP54 to OP59 is processing if the "operation type" of the entry detected in OP52 in the destination determination table 24 is "transmission-side". In this case, the packet included in the PacketIn message is not a packet in the security communication format, but a packet in the normal format.

In OP54, the packet operation unit 22 temporarily stores a destination address stored in a destination address field of a header of the packet included in the PacketIn message.

In OP55, the packet operation unit 22 substitutes the value in the destination address field of the header of the packet included in the PacketIn message, with a random number.

In OP56, the packet operation unit 22 inserts the temporarily stored original destination address into a position in a payload, the position corresponding to a value of a bit string at a confirmation position in the destination address field. Hereinafter, the value indicated by the bit string at the confirmation position in the header is referred to as DA. In other words, in OP56, the packet operation unit 22 inserts the original destination address into a DA-th byte from a head of the payload.

In OP57, the packet operation unit 22 creates one dummy packet each time the packet operation unit 22 processes a predetermined number of packets included in a flow of packets included in the PacketIn message, from the switch 3 that is the source of the PacketIn message. A source address in a header of the dummy packet is the same as the source address in the header of the packet included in the PacketIn message. A random number is stored in a destination address in the header of the dummy packet.

In OP58, the packet operation unit 22 stores a value indicating a dummy packet, into a DA-th byte in a payload. Here, in OP58, DA is a value of a bit string at a confirmation position in the header of the dummy packet. Also, the processing in OP57 and OP58 is performed at a timing when the dummy packet is created, and is not performed in other cases.

In OP59, the packet operation unit 22 transmits a PacketOut message including the packet subjected to the processing in OP56 and designating the "forwarding destination" of the entry detected in OP52 in the destination determination table 24 as a forwarding destination. The PacketOut message is transmitted to the switch 3 that is the source of the PacketIn message. If the processing in OP57 and OP58 is performed, the packet operation unit 22 performs processing similar to the above for the dummy packets. Subsequently, the processing indicated in FIG. 16A ends.

The processing in OP61 to OP66 in FIG. 16B if the "operation type" of the entry detected in OP52 in the destination determination table 24 is "reception-side" or "relay". In this case, the packet included in the PacketIn message is a packet in the security communication format.

In OP61, the packet operation unit 22 determines whether or not the "operation type" of the entry detected in OP52 in the destination determination table 24 is "relay". If the "operation type" is "relay" (OP61: YES), the processing proceeds to OP62. If the "operation type" is not "relay", in other words, if the "operation type" is "reception-side" (OP61: NO), the processing proceeds to OP63.

In OP62, since the "operation type" is "relay", the packet operation unit 22 transmits a PacketOut message designating the "forwarding destination" of the entry in the destination determination table 24 as a forwarding destination, to the switch 3 that is the source of the PacketIn message. Subsequently, the processing indicated in FIG. 16B ends.

The processing in OP63 to OP66 is processing if the "operation type" is the "reception-side". In OP63, the packet operation unit 22 determines whether or not the value of the DA-th byte from the head of the payload is a value indicating a dummy packet. DA in this case is a value of the bit string at the confirmation position in the header of the packet included in the PacketIn message. The confirmation position and the dummy value are obtained from the entry detected in OP52 in the destination determination table 24.

If the value of the DA-th byte from the head of the payload is a value indicating that the relevant packet is a dummy packet (OP63: YES), the processing proceeds to OP66. In OP66, since the packet included in the PacketIn message is a dummy packet, the packet operation unit 22 drops the packet.

If the value of the DA-th byte from the head of the payload is not a value indicating a dummy packet (OP63: NO), the processing proceeds to OP64.

In OP64, the packet operation unit 22 rewrites the destination address field of the header with the address stored in the DA-th byte from the head of the payload, and deletes the address stored in the DA-th byte from the head of the payload.

In OP65, the packet operation unit 22 transmits a PacketOut message designating the "forwarding destination" of the entry in the destination determination table 24 as a forwarding destination, to the switch 3 that is the source of the PacketIn message. In the PacketIn message, the packet processed in OP64 is stored. Subsequently, the processing indicated in FIG. 16B ends.

Figure 17:
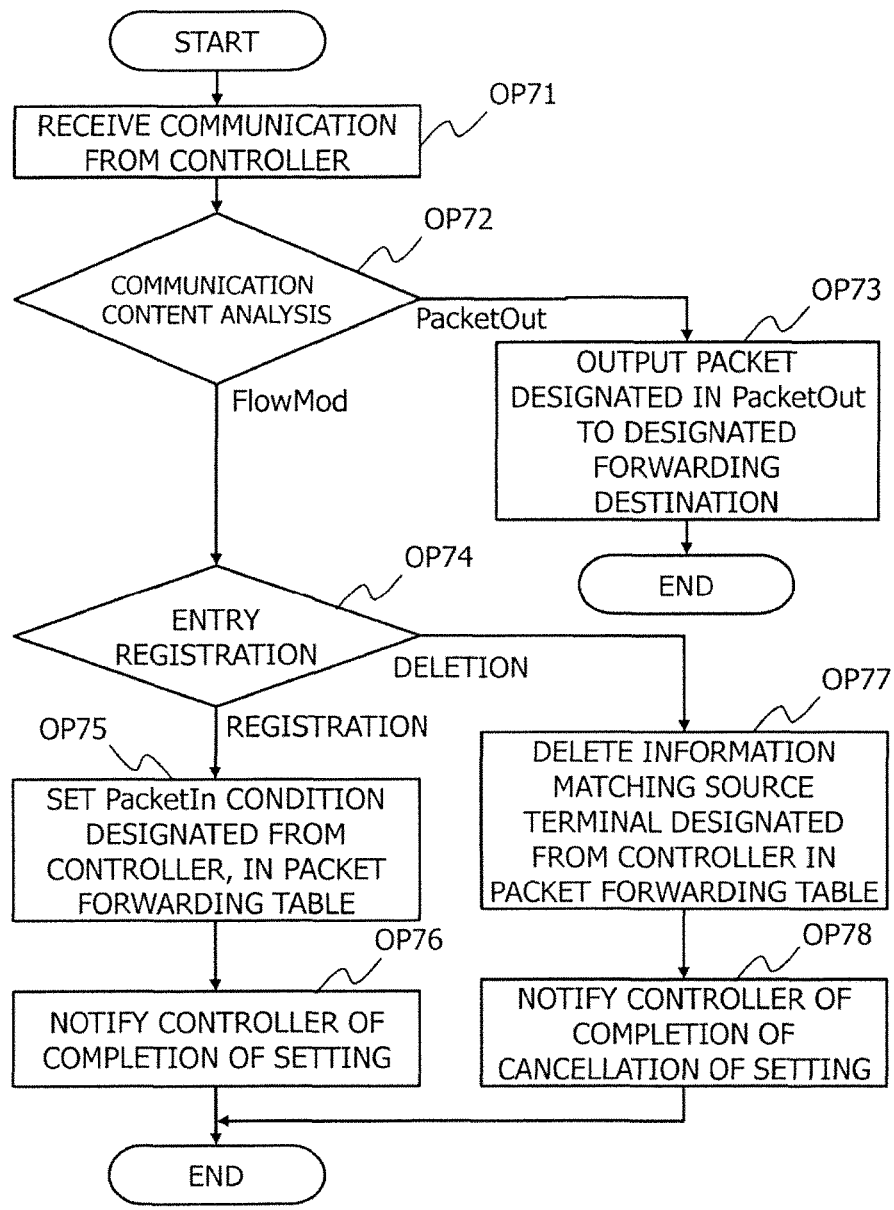
FIG. 17 is an example of a flowchart of processing in a forwarding destination setting unit in a switch upon reception of a communication from the controller.

FIG. 17 is an example of a flowchart of processing in the forwarding destination setting unit 33 of a switch 3 if a communication is received from the controller 2. The processing in FIG. 17 is started upon the switch 3 receiving a communication from the controller 2. Although an entity that performs processing in the example indicated in FIG. 17 is the CPU 301 of the switch 3, the CPU 301 executing the program for an OpenFlow switch, for sake of simplicity, the description will be provided with the forwarding destination setting unit 33, which is a functional component, as the entity.

In OP71, the forwarding destination setting unit 33 receives a communication from the controller 2 through the C plane communication unit 31.

In OP72, the forwarding destination setting unit 33 analyzes the content of the communication from the controller 2. If the content of the communication from the controller 2 is a FlowMod message (OP72: FlowMod), the processing proceeds to OP74. If the content of the communication from the controller 2 is PacketOut message (OP72: PacketOut), the processing proceeds to OP73.

In OP73, the forwarding destination setting unit 33 instructs the packet forwarding unit 34 to output a packet designated by the PacketOut message to a forwarding destination designated by the PacketOut message. The packet forwarding unit 34 forwards the packet designated by the PacketOut message to the forwarding destination designated by the PacketOut message. Subsequently, the processing indicated in FIG. 17 ends.

In OP74, the forwarding destination setting unit 33 determines whether or not the FlowMod message includes an instruction for registration of a flow entry. If the FlowMod message includes an instruction for flow entry registration (OP74: registration), the processing proceeds to OP75. If the FlowMod message includes an instruction for deletion of a flow entry (OP74: deletion), the processing proceeds to OP77.

In OP75, the forwarding destination setting unit 33 registers the flow entry included in the FlowMod message, into the flow table. In OP76, the forwarding destination setting unit 33 notifies the controller 2 of completion of setting through the C plane communication unit 31. Subsequently, the processing indicated in FIG. 17 ends.

In OP77, the forwarding destination setting unit 33 deletes a flow entry matching the flow entry included in the FlowMod message from the flow table. In OP78, the forwarding destination setting unit 33 notifies the controller 2 of completion of cancellation of the setting through the C plane communication unit 31. Subsequently, the processing indicated in FIG. 17 ends.

Figure 18:
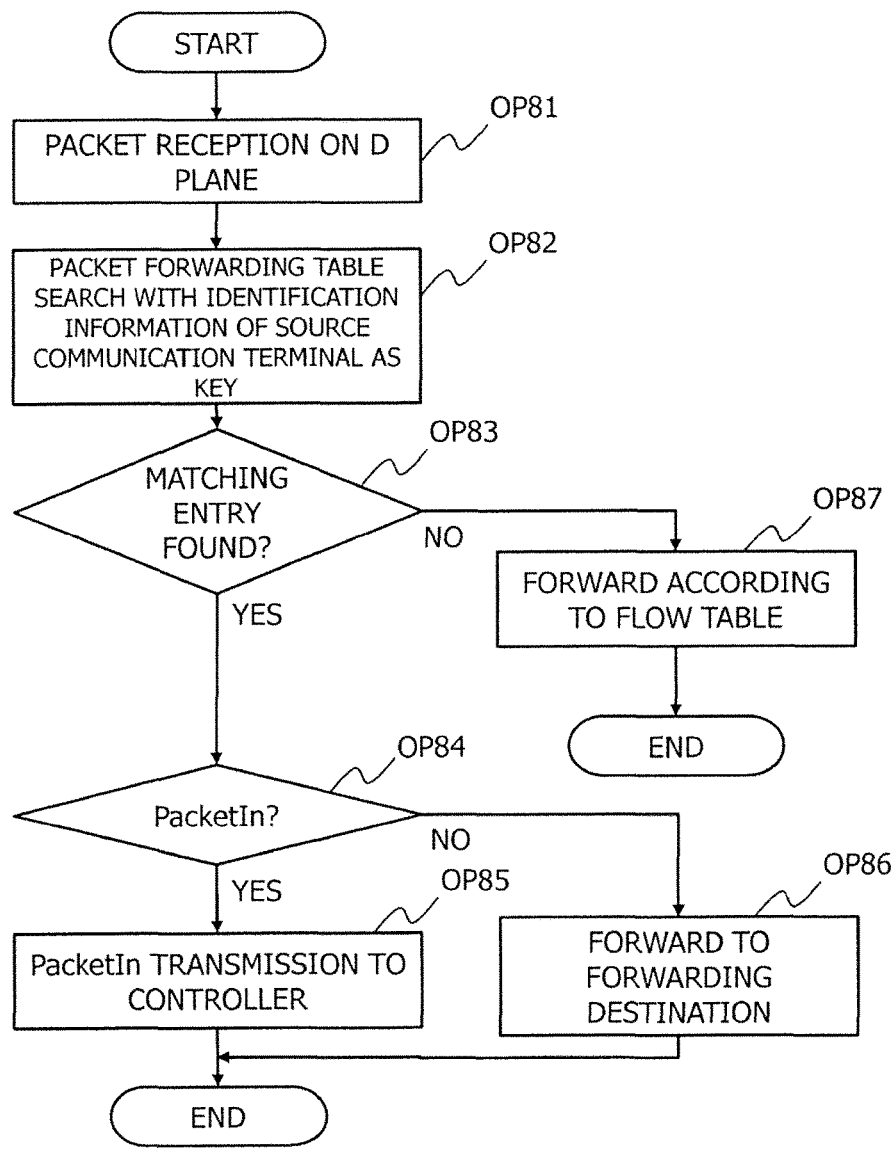
FIG. 18 is an example of a flowchart of processing in a packet forwarding unit in a switch upon reception of packets on a data plane.

FIG. 18 is an example of a flowchart of processing in the packet forwarding unit 34 of a switch 3 if a packet is received on the data plane. The processing indicated in FIG. 18 is started upon reception of a packet on the data plane. As with FIG. 17, the description of the processing in FIG. 18 will be provided with the packet forwarding unit 34, which is a functional component, as an entity.

In OP81, the packet forwarding unit 34 receives a packet through the D plane communication unit 32. In OP82, the packet forwarding unit 34 searches the packet forwarding table 35 with a source address in the received packet as a key.

In OP83, the packet forwarding unit 34 determines whether or not there is an entry matching the source address in the received packet, in the packet forwarding table 35. If there is an entry matching the source address in the received packet, in the packet forwarding table 35 (OP83: YES), the processing proceeds to OP84. If there is no entry matching the source address in the received packet, in the packet forwarding table 35 (OP83: NO), the processing proceeds to OP87.

In OP84, the packet forwarding unit 34 determines whether or not the entry in the packet forwarding table 35, the entry matching the source address in the received packet, is one that provides an instruction to transmit a PacketIn message. If the entry in the packet forwarding table 35, the entry matching the source address in the received packet, is one that provides an instruction to transmit a PacketIn message (OP84: YES), the processing proceeds to OP85. If the entry in the packet forwarding table 35, the entry matching the source address in the received packet, is not one that provides an instruction to transmit a PacketIn message (OP84: NO), the processing proceeds to OP86.

In OP85, the packet forwarding unit 34 instructs the forwarding destination setting unit 33 to transmit a PacketIn message. Consequently, the forwarding destination setting unit 33 transmits a PacketIn message to the controller 2 through the C plane communication unit 31. Subsequently, the processing indicated in FIG. 18 ends.

In OP86, the packet forwarding unit 34 forwards the packet to a forwarding destination indicated by the entry in the packet forwarding table 35, the entry matching the source address in the received packet. Subsequently, the processing indicated in FIG. 18 ends.

In OP87, the packet forwarding unit 34 forwards the packet according to a flow entry matching, e.g., a destination address and the source address in the received packet. Subsequently, the processing indicated in FIG. 18 ends.

Figure 19A:
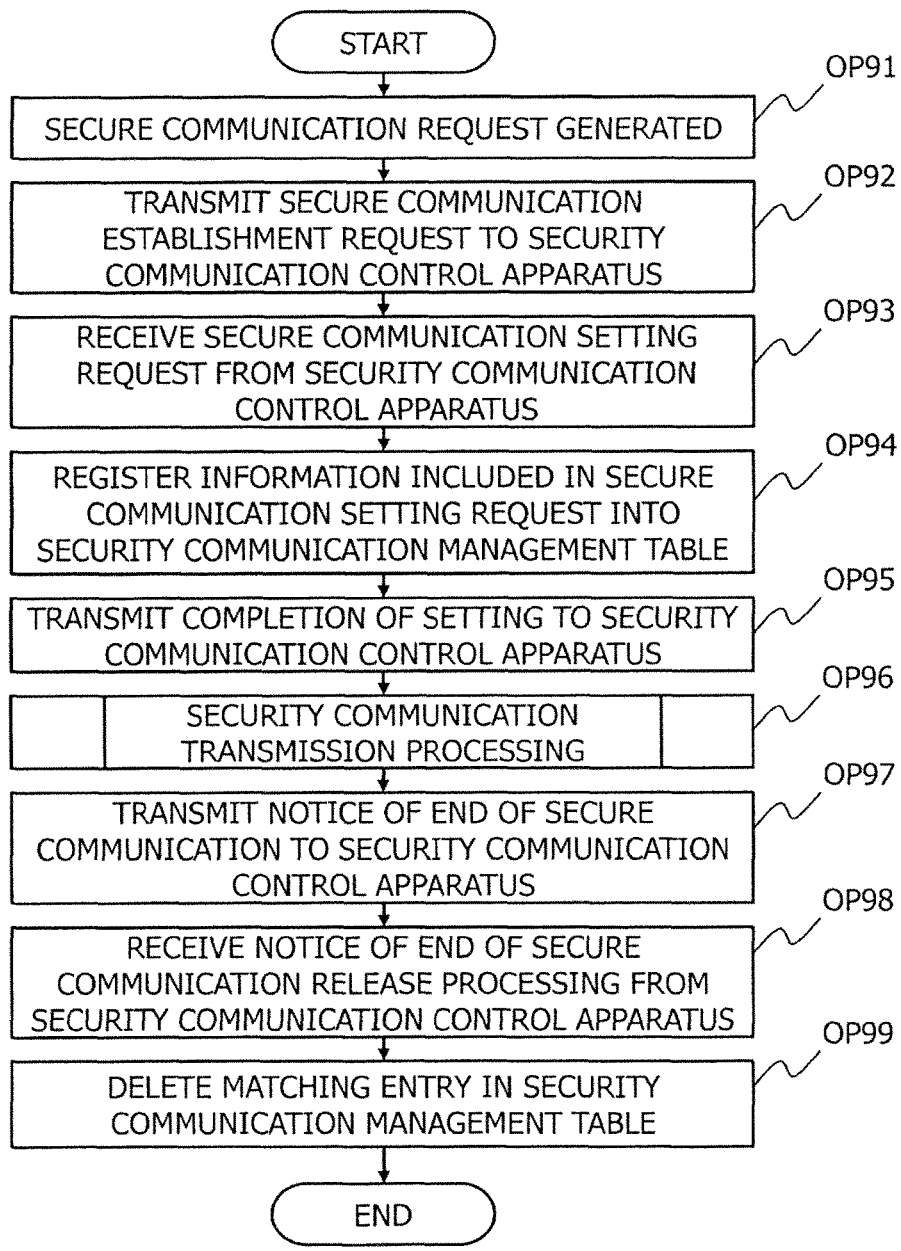
FIG. 19A is an example of a flowchart of processing in a communication terminal as a source.

FIG. 19A is an example of a flowchart of processing in a communication terminal 4 as a source. The processing indicated in FIG. 19A is started, for example, upon provision of a request for a secure communication from an application in the communication terminal 4. Although an entity that performs the processing indicated in FIG. 19A is the CPU of the communication terminal 4, for sake of simplicity, the description will be provided with the packet operation unit 42 and the communication management unit 43, which are functional components provided by the CPU executing the secure communication utilization program stored in the external storage device, as the entity.

In OP91, the communication management unit 43 detects generation of a request for a secure communication from an application.

In OP92, the communication management unit 43 transmits a secure communication establishment request to the security communication control apparatus 1 through the communication unit 41. The secure communication establishment request includes a source address and a destination address. Here, the source address included in the secure communication establishment request is an address of the own apparatus.

In OP93, the communication management unit 43 receives a secure communication setting request from the security communication control apparatus 1 through the communication unit 41. The secure communication setting request includes a secure communication ID, the source address, a destination address, a confirmation position and a dummy value. In OP94, the communication management unit 43 registers the information included in the secure communication setting request, into the security communication management table 44.

In OP95, the communication management unit 43 notifies the security communication control apparatus 1 of completion of setting through the communication unit 41.

In OP96, the packet operation unit 42 performs secure communication transmission processing. The secure communication transmission processing is processing for converting packets into the secure communication format and transmitting the packets. Details of the secure communication transmission processing will be described later. Upon an end of transmission of the packets in the secure communication, the processing proceeds to OP97.

In OP97, the communication management unit 43 transmits a notice of the end of the secure communication to the security communication control apparatus 1 through the communication unit 41. The notice of the end of the secure communication includes the secure communication ID of the ended secure communication.

In OP98, the communication management unit 43 receives a notice of an end of secure communication release processing from the security communication control apparatus 1 through the communication unit 41. The notice of an end of secure communication release processing includes the secure communication ID.

In OP99, the communication management unit 43 deletes an entry in the security communication management table 44, the entry matching the secure communication ID included in the notice of an end of secure communication release processing. Subsequently, the processing indicated in FIG. 19A ends.

FIG. 19B is an example of a flowchart of security communication transmission processing in a communication terminal 4. In OP101, the packet operation unit 42 sets a variable number n to 1. The variable number n is used for timing dummy packet creation and transmission. The variable number n takes a value of from 1 to N. N is, for example, 5. The value of N may be determined by, for example, a manager of the communication system 100 or may be determined depending on the coding algorithm.

In OP102, the packet operation unit 42 substitutes a destination address field in a header of a packet to be transmitted, with a random number.

In OP103, the packet operation unit 42 inserts an original destination address in a DA-th byte from a head of a payload of the packet to be transmitted. The DA in OP103 is a value of a bit string at a confirmation position in the random number substituted in the destination address field of the header in OP102. The confirmation position is obtained from the relevant entry from the security communication management table 44.

In OP104, the packet operation unit 42 transmits the packet converted into the secure communication format by means of the processing in OP102 and OP103, through the communication unit 41.

In OP105, the packet operation unit 42 determines whether or not there are no further packets to be transmitted left. If there are no further packets to be transmitted left (OP105: YES), the processing indicated in FIG. 19B ends, and the processing proceeds to OP97 in FIG. 19A. If there are packets to be transmitted left (OP105: NO), the processing proceeds to OP106.

In OP106, the packet operation unit 42 determines whether or not the variable number n is a maximum value N. If the variable number n is a maximum value N (OP106: YES), the processing proceeds to OP108. If the variable number n is not a maximum value N (OP106: NO), the processing proceeds to OP107.

In OP107, since the variable number n is not a maximum value N, the packet operation unit 42 updates the variable number n to a value incremented by one. Subsequently, the processing proceeds to OP102, processing on a next packet to be transmitted is performed.

In OP108, since the variable n is the maximum value N, which is a timing for creation and transmission of a dummy packet, the packet operation unit 42 creates a dummy packet. A destination address in a header of the dummy packet is a random number, and a source address is an address of the own apparatus.

In OP109, the packet operation unit 42 inserts a value indicating a dummy packet into a DA-th byte from a head of a payload of the dummy packet. The value indicating a dummy packet is obtained from the relevant entry in the security communication management table 44. The DA in OP109 is a value of a bit string at a confirmation position in a random number in a destination address field of the header of the dummy packet. The confirmation position is obtained from the relevant entry in the security communication management table 44.

In OP110, the packet operation unit 42 transmits the dummy packet through the communication unit 41. Subsequently, the processing proceeds to OP101, and processing on a next packet is performed.

Figure 20:
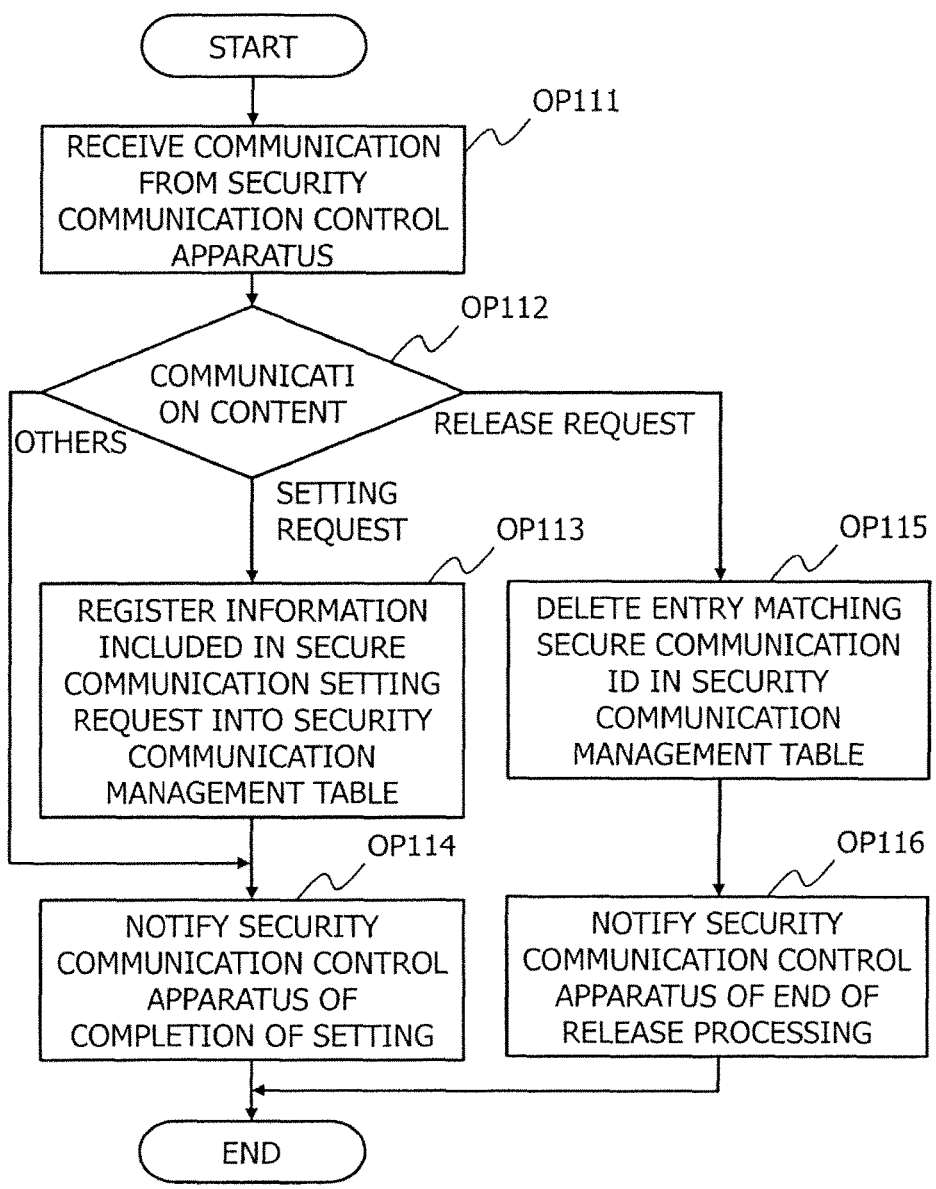
FIG. 20 is an example of a flowchart of processing in a communication terminal as a destination upon reception of a communication from the security communication control apparatus.

FIG. 20 is an example of a flowchart of processing in a communication terminal 4 as a destination when a communication is received from the security communication control apparatus 1. The processing indicated in FIG. 20 is started upon the communication terminal 4 receiving a communication from the security communication control apparatus 1. Although an entity that performs the processing indicated in FIG. 20 is the CPU, for sake of simplicity, the description will be described with the communication management unit 43, which is a functional component, as the entity.

In OP111, the communication management unit 43 receives a communication from the security communication control apparatus 1 through the communication unit 41.

In OP112, the communication management unit 43 analyzes the content of the communication from the security communication control apparatus 1. If the content of the communication from the security communication control apparatus 1 is a secure communication setting request including an address of the own apparatus as a destination address (OP112: setting request), the processing proceeds to OP113. If the content of the communication from the security communication control apparatus 1 is a secure communication release request (OP112: release request), the processing proceeds to OP115.

If the content of the communication from the security communication control apparatus 1 is neither a secure communication setting request including the address of the own apparatus as a destination address nor a secure communication release request (OP112: other), the processing indicated in FIG. 20 ends. The content of the communication from the security communication control apparatus 1, the content being neither a secure communication setting request including the address of the own apparatus as a destination address nor a secure communication release request, is, for example, a secure communication setting request including the address of the own apparatus as a source address.

In OP113, the communication management unit 43 registers information included in the secure communication setting request into the security communication management table 44. The secure communication setting request includes a secure communication ID, the destination address, a source address, a confirmation position and a dummy value.

In OP114, the communication management unit 43 notifies the security communication control apparatus 1 of completion of setting through the communication unit 41, as a response to the secure communication setting request. Subsequently, the processing indicated in FIG. 20 ends.

In OP115, the communication management unit 43 deletes an entry in the security communication management table 44, the entry matching a secure communication ID included in the secure communication release request. In OP116, the communication management unit 43 notifies the security communication control apparatus 1 of an end of secure communication release processing through the communication unit 41, as a response to the secure communication release request. Subsequently, the processing indicated in FIG. 20 ends.

Figure 21:
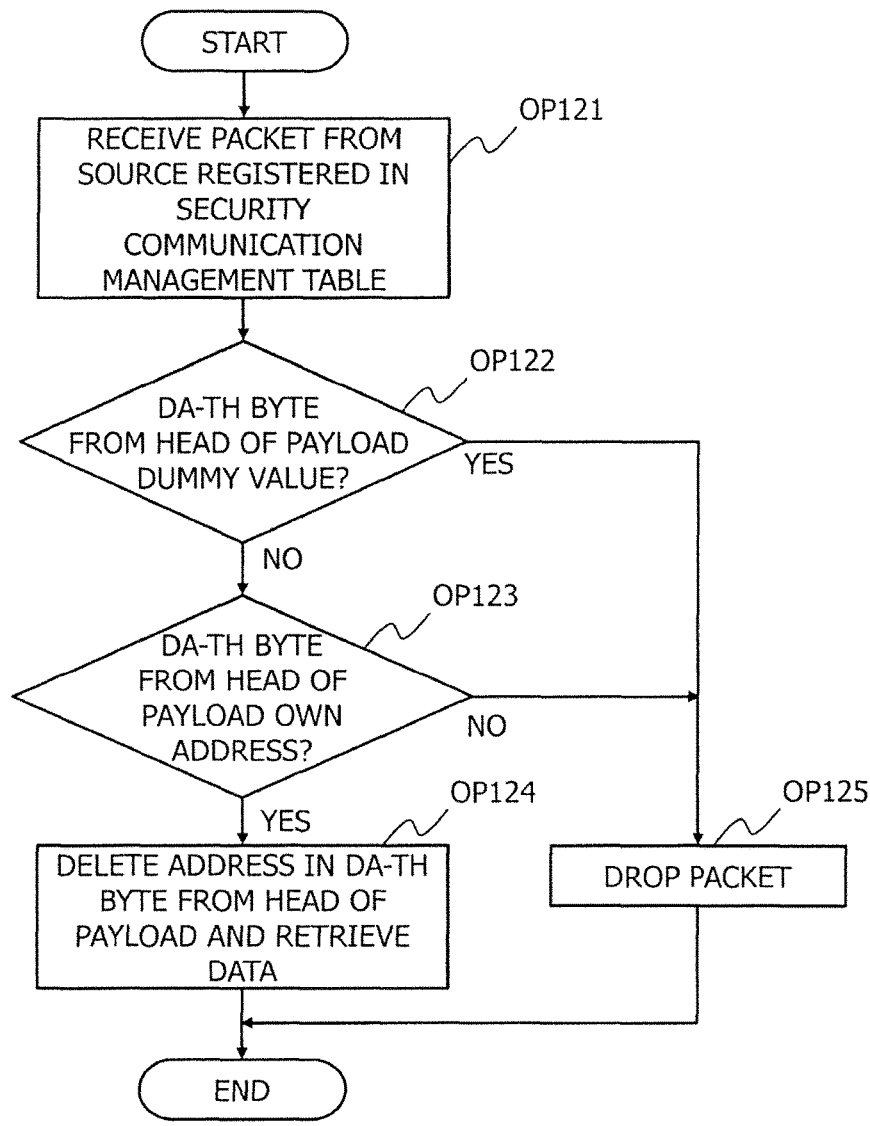
FIG. 21 is an example of a flowchart of processing in a destination communication terminal upon reception of a communication from a source communication terminal.

FIG. 21 is an example of a flowchart of processing in a destination communication terminal 4 upon reception of a communication from a source communication terminal 4. The processing indicated in FIG. 21 is started when a communication terminal 4 receives a packet and a source address of the received packet is registered in the security communication management table 44. Although an entity that performs the processing indicated in FIG. 21 is the CPU, for sake of simplicity, the description will be described with the packet operation unit 42, which is a functional component, as the entity.

In OP121, the packet operation unit 42 receives a packet, a source address of which is registered in the security communication management table 44, through the communication unit 41.

In OP122, the packet operation unit 42 determines whether or not a value stored in a DA-th byte from a head of a payload of the received packet is a value indicating a dummy packet. The DA in OP122 is a value of the "confirmation position" of an entry in the security communication management table 44, the entry matching the source address of the received packet. Also, the value indicating a dummy packet is also obtained from the "dummy value" of the entry in the security communication management table 44, the entry matching the source address of the received packet.

If the value stored in the DA-th byte from the head of the payload of the received packet is the value indicating a dummy packet (OP122: YES), the processing proceeds to OP125. If the value stored in the DA-th byte from the head of the payload of the received packet is the value indicating that the relevant packet is not a dummy packet (OP122: NO), the processing proceeds to OP123.

In OP123, the packet operation unit 42 determines whether or not the value stored in the DA-th byte from the head of the payload of the received packet is an address of the own apparatus. The DA in OP123 is a value that is the same as DA in OP122. If the value stored in the DA-th byte from the head of the payload of the received packet is an address of the own apparatus (OP123: YES), the processing proceeds to OP124. If the value stored in the DA-th byte from the head of the payload of the received packet is not the address of the own apparatus (OP123: NO), the processing proceeds to OP125.

In OP124, the packet operation unit 42 deletes the address stored in the DA-th byte from the head of the payload of the received packet, and retrieves the payload of the received packet, and for example, the packet operation unit 42 delivers data in the payload of the received packet to a relevant application. Subsequently, the processing indicated in FIG. 21 ends.

In OP125, since the received packet is a dummy packet or a packet in a communication directed to another apparatus, the packet operation unit 42 drops the received packet. Subsequently, the processing indicated in FIG. 21 ends.

Note that each of the flowcharts indicated in FIGS. 14A to 21 is a mere example and, e.g., the processing order may be changed depending on the embodiment.

Specific Example

Figure 22:
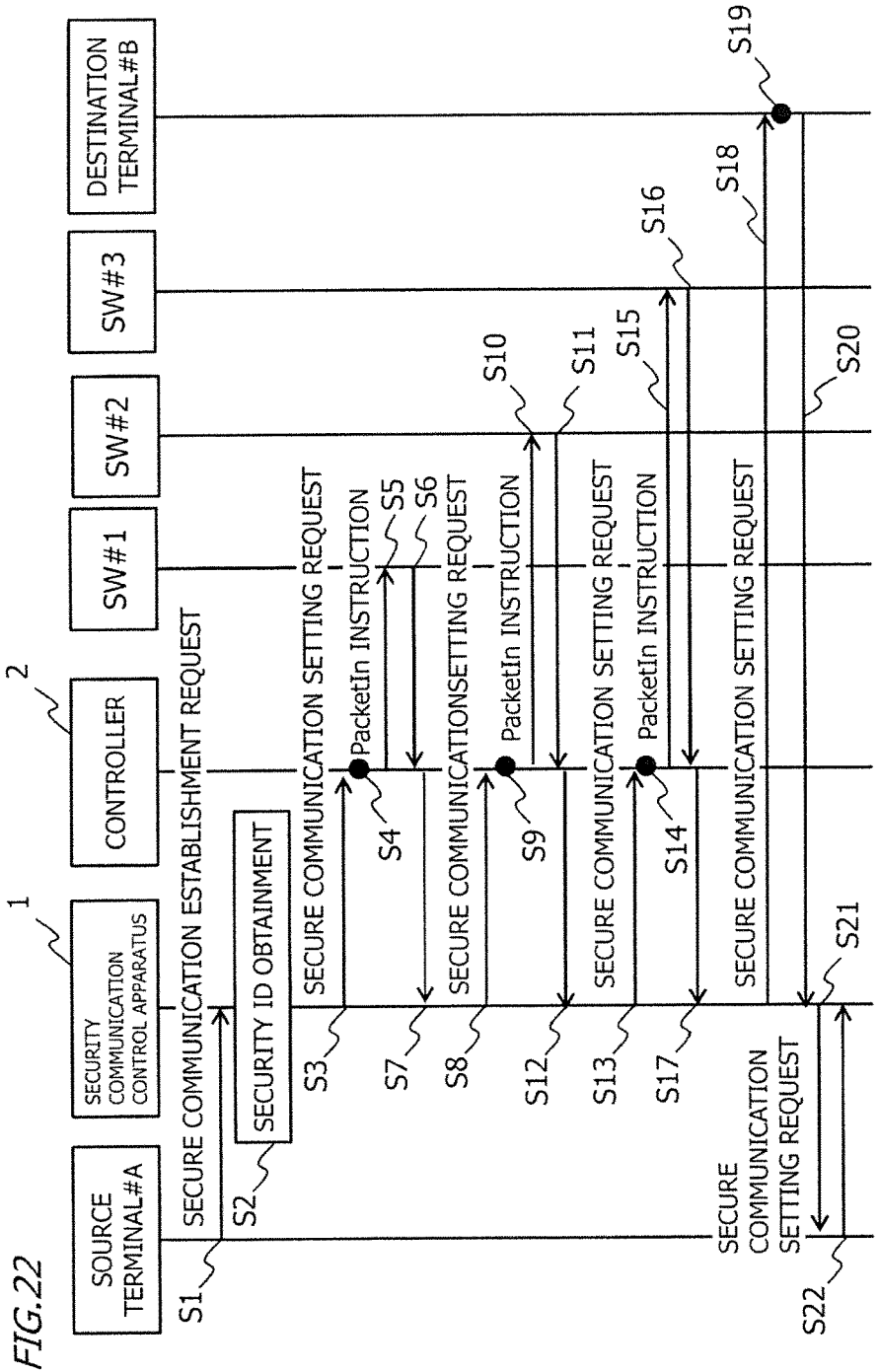
FIG. 22 is a diagram illustrating an example of a setting processing sequence in the communication system before a start of a secure communication.

FIG. 22 is a diagram illustrating an example of a sequence of a setting processing in the communication system 100 before a start of a secure communication. FIG. 22 is based on the communication system 100 illustrated in FIG. 1.

In S1, a request for secure communication to destination terminal #B is generated in source terminal #A (FIG. 19A, OP91), source terminal #A transmits a secure communication establishment request to the security communication control apparatus 1 (FIG. 19A, OP92). The secure communication establishment request includes IP addresses of source terminal #A and destination terminal #B.

In S2, the security communication control apparatus 1 receives the secure communication establishment request (FIG. 14A, OP2: establishment request), determines, e.g., a secure communication ID between source terminal #A and destination terminal #B and a confirmation position, and updates the communication path information table 14 (FIG. 14A, OP3). The communication path information table 14 updated in S2 is assumed to be one indicated in FIG. 7.

In S3, the security communication control apparatus 1 transmits a secure communication setting request to the controller 2. In the example indicated in FIG. 22, an apparatus interposed first on a path between source terminal #A and destination terminal #B is switch #1 (see FIG. 7). There is no external network preceding or following switch #1 (FIG. 14A, OP7: NO, and FIG. 14B, OP10: NO), and there is switch #2 following switch #1 (FIG. 14B, OP11: YES), and thus, the security communication control apparatus 1 determines that the operation type of switch #1 is "relay" (FIG. 14B, OP12). Therefore, the secure communication setting request transmitted in S3 includes secure communication ID "1", switch identification information "1", source "communication terminal #A", forwarding destination "switch #2", confirmation position "first byte of destination address", dummy value "0" and operation type "relay".

In S4, the controller 2 receives the secure communication setting request from the security communication control apparatus 1 (FIG. 15A, OP31, OP32: NO), and registers the information included in the secure communication setting request into the destination determination table 24 (FIG. 15A, OP33). The entry registered in the destination determination table 24 in S4 is the entry on the first row in FIG. 9.

In S5, the controller 2 transmits a FlowMod message including a PacketIn instruction, to switch #1 (FIG. 15A, OP34). The FlowMod message transmitted in S5 includes a flow entry indicating that a PacketIn message is transmitted upon reception of a packet, a source of which is communication terminal #A.

In S6, switch #1 receives the FlowMod message (FIG. 17, OP71, OP72: FlowMod), registers the flow entry included in the FlowMod message into the flow table (FIG. 17, OP74: registration, OP75), and notifies the controller 2 of completion of setting as a response (FIG. 17, OP76). It is assumed that the entry registered the flow table (packet forwarding table 35) in switch #1 in S6 is the entry of the packet forwarding table 35 indicated in FIG. 11.

In S7, the controller 2 receives the completion of setting from switch #1 (FIG. 15A, OP35), notifies the security communication control apparatus 1 of the completion of setting (FIG. 15A, OP36).

In S8, the security communication control apparatus 1 transmits a secure communication setting request to the controller 2. In the example indicated in FIG. 22, on the path between source terminal #A and destination terminal #B, an apparatus interposed next to switch #1 is switch #2 (see FIG. 7). There is no external network preceding switch #2 (FIG. 14A, OP7: NO), and there is a secure network that is an external network next to switch #2 (FIG. 14B, OP10: YES). Therefore, the security communication control apparatus 1 determines that the operation type of switch #2 is "reception-side" (FIG. 14B, OP15). Therefore, the secure communication setting request transmitted in S8 includes secure communication ID "1", switch identification information "2", source "communication terminal #A", forwarding destination "external network", confirmation position "first byte of destination address", dummy value "0" and operation type "reception-side".

In S9, the controller 2 receives the secure communication setting request from the security communication control apparatus 1 (FIG. 15A, OP31, OP32: NO), and registers the information included in the secure communication setting request into the destination determination table 24 (FIG. 15A, OP33). The entry registered in the destination determination table 24 in S5 is the entry on the second row in the destination determination table 24 indicated in FIG. 9.

In S10, the controller 2 transmits a FlowMod message including a PacketIn instruction, to switch #2 (FIG. 15A, OP34). The FlowMod message transmitted in S10 includes a flow entry indicating that upon reception of a packet, a source of which is communication terminal #A, a PacketIn message is transmitted.

In S11, switch #2 receives the FlowMod message (FIG. 17, OP71, OP72: FlowMod), and registers the flow entry included in FlowMod message into the flow table (FIG. 17, OP74: registration, OP75), and notifies the controller 2 of completion of setting as a response (FIG. 17, OP76). It is assumed that the entry registered in the flow table (packet forwarding table 35) in switch #2 in S11 is the entry of the packet forwarding table 35 indicated in FIG. 11.

In S12, the controller 2 receives the completion of setting from switch #2 (FIG. 15A, OP35), and notifies the security communication control apparatus 1 of the completion of setting (FIG. 15A, OP36).

In S13, the security communication control apparatus 1 transmits a secure communication setting request to the controller 2. In the example indicated in FIG. 22, on the path between source terminal #A and destination terminal #B, an apparatus interposed next to the secure network is switch #3 (see FIG. 7). Since there is the external network preceding switch #3 (FIG. 14A, OP7: YES), the security communication control apparatus 1 determines that the operation type is "transmission-side" for switch #3 (FIG. 14A, OP8). Therefore, the secure communication setting request transmitted in S13 includes secure communication ID "1", switch identification information "3", source "communication terminal #A", forwarding destination "communication terminal #B", confirmation position "first byte of destination address", dummy value "0" and operation type "transmission-side".

In S14, the controller 2 receives the secure communication setting request from the security communication control apparatus 1 (FIG. 15A, OP31, OP32: NO), and registers the information included in the secure communication setting request into the destination determination table 24 (FIG. 15A, OP33). The entry registered in the destination determination table 24 in S14 is the entry on the third row in the destination determination table indicated in FIG. 9.

In S15, the controller 2 transmits a FlowMod message including a PacketIn instruction, to switch #3 (FIG. 15A, OP34). The FlowMod message transmitted in S15 includes a flow entry indicating that upon reception of a packet, a source of which is communication terminal #A, a PacketIn message is transmitted.

In S16, switch #3 receives the FlowMod message (FIG. 17, OP71, OP72: FlowMod), registers the flow entry included in the FlowMod message into the flow table (FIG. 17, OP74: registration, OP75), and notifies the controller 2 of completion of setting as a response (FIG. 17, OP76). It is assumed that the entry registered in the flow table (packet forwarding table 35) in the switch #3 in S16 is the entry of the packet forwarding table 35 illustrated in FIG. 11.

In S17, the controller 2 receives the completion of setting from switch #3 (FIG. 15A, OP35), and notifies the security communication control apparatus 1 of the completion of setting (FIG. 15A, OP36).

In S18, the security communication control apparatus 1 receives the completion of setting from the controller 2 (FIG. 14A, OP9), and transmits a secure communication setting request to destination terminal #B (FIG. 14C, OP17). This is because on the path between source terminal #A and destination terminal #B, there is destination terminal #B next to switch #3 (FIG. 14C, OP16: YES). The secure communication setting request transmitted in S18 includes secure communication ID "1", source "communication terminal #A", destination "communication terminal #B", confirmation position "first byte of destination address" and dummy value "0".

In S19, destination terminal #B receives the secure communication setting request from the security communication control apparatus 1 (FIG. 20, OP111, OP112: setting request), and registers the information included in the secure communication setting request into the security communication management table 44 (FIG. 20, OP113). In S20, destination terminal #B notifies the security communication control apparatus 1 of completion of setting (FIG. 20, OP114).

In S21, the security communication control apparatus 1 receives the completion of setting from destination terminal #B (FIG. 14C, OP18), and transmits a secure communication setting request to source terminal #A (FIG. 14C, OP19). The secure communication setting request transmitted to source terminal #A includes information that is the same as that transmitted to destination terminal #B in S18.

In S22, source terminal #A receives the secure communication setting request from the security communication control apparatus 1 (FIG. 19A, OP93), registers the information in the secure communication setting request into the security communication management table 44 (FIG. 19A, OP94), and transmits completion of setting to the security communication control apparatus 1 (FIG. 19A, OP95). In the above, the setting for secure communication is completed, and transmission of secure communication packets from source terminal #A is started.

Figure 23:
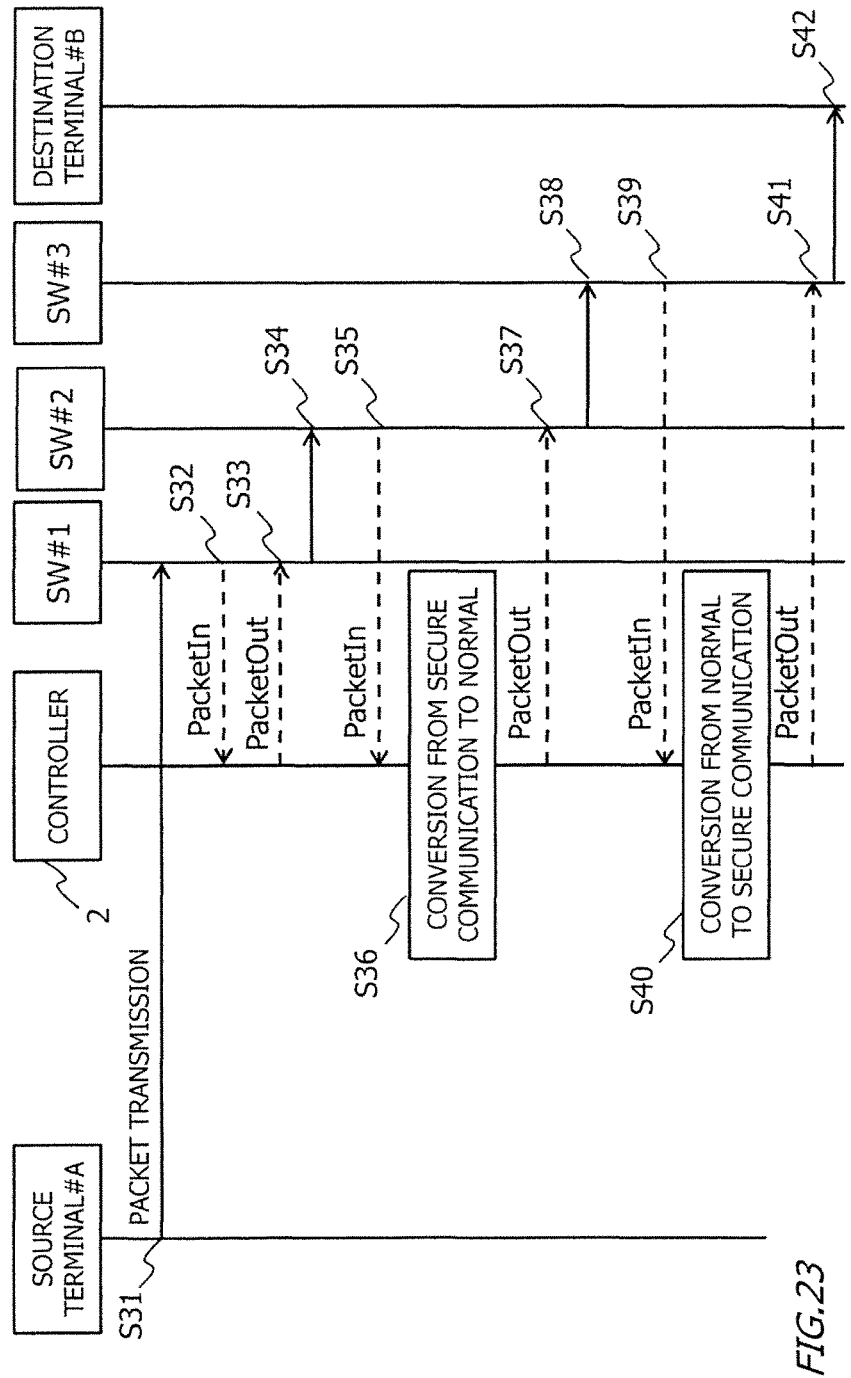
FIG. 23 is a diagram illustrating an example of a sequence of secure communication forwarding processing in the communication system.

FIG. 23 is a diagram illustrating an example of a sequence of secure communication forwarding processing in the communication system 100. FIG. 23 is also based on the communication system 100 illustrated in FIG. 1 and indicates a state in which the secure communication setting processing in FIG. 22 has been completed. In FIG. 23, control plane communications are indicated by dotted lines and data plane communications are indicated by solid lines.

In S31, source terminal #A transmits a packet in the secure communication format. The packet transmitted from source terminal #A is delivered to switch #1.

In S32, switch #1 receives the packet (FIG. 18, OP81), and transmits a PacketIn message to the controller 2 for the packet from source terminal #A according to the packet forwarding table 35 (flow table; see FIG. 11) (FIG. 18, OP85).

In S33, the controller 2 receives the PacketIn message from switch #1 (FIG. 16A, OP51), and transmits a PacketOut message to switch #1. In the entry corresponding to switch #1 in the destination determination table 24 in the controller 2, the "operation type" is "relay" (FIG. 16B, OP61: YES). Therefore, in the PacketOut message transmitted in S33, switch #2 is designated as a forwarding destination of the packet (FIG. 16B, OP62).

In S34, switch #1 forwards the packet to switch #2, which is the forwarding destination designated in the PacketOut message.

In S35, switch #2 receives the packet (FIG. 18, OP81), and transmits a PacketIn message to the controller 2 for the packet from source terminal #A according to the packet forwarding table 35 (flow table, see FIG. 11) (FIG. 18, OP85).

In S36, the controller 2 receives the PacketIn message from switch #2 (FIG. 16A, OP51) and converts the packet included in the PacketIn message into a packet in the normal format (FIG. 16B, OP64). This is because in the entry corresponding to switch #2 in the destination determination table 24 in the controller 2, the "operation type" is "reception-side" (FIG. 16B, OP61: NO). Here, if the received packet is a dummy packet, the controller 2 drops the packet.

In S37, the controller 2 transmits a PacketOut message to switch #2. The PacketOut message transmitted in S37 includes destination terminal #B as a forwarding destination of the packet, and the packet converted from the secure communication format into the normal format (FIG. 16B, OP65).

In S38, switch #2 forwards the packet toward destination terminal #B, which is the forwarding destination designated in the PacketOut message. The packet is delivered to switch #3 via a secure network (not illustrated in FIG. 22).

In S39, switch #3 receives the packet (FIG. 18, OP81), and transmits a PacketIn message to the controller 2 for the packet from the source terminal #A according to the packet forwarding table 35 (flow table; see FIG. 11) (FIG. 18, OP85).

In S40, the controller 2 receives the PacketIn message from switch #3 (FIG. 16A, OP51), and converts the packet in the normal format into a packet in the secure communication format (FIG. 16A, OP54 to OP56). This is because in the entry corresponding to switch #3 in the destination determination table 24 in the controller 2, the "operation type" is "transmission-side" (FIG. 16A, OP53: YES).

In S41, the controller 2 transmits a PacketOut message to switch #3. The PacketOut message transmitted in S41 includes destination terminal #B as the packet forwarding destination and the packet converted into the secure communication format (FIG. 16A, OP59).

In S42, switch #3 forwards the packet to destination terminal #B, which is the forwarding destination designated in the PacketOut message. Consequently, the secure communication packet transmitted from source terminal #A is delivered to destination terminal #B.

FIG. 24 is a diagram illustrating an example of a sequence of secure communication release processing in the communication system 100. FIG. 24 is also based on the communication system 100 in FIG. 1 and indicates a state in which the secure communication forwarding processing in FIG. 23 is being performed.

In S51, transmission of data in the secure communication with destination terminal #B ends, and source terminal #A transmits a notice of the end of the secure communication to the security communication control apparatus 1 (FIG. 19A, OP97). The notice of the end of the secure communication includes secure communication ID "1".

In S52, the security communication control apparatus 1 receives the notice of the end of the secure communication from source terminal #A (FIG. 14A, OP1, OP2: end notice), and transmits a secure communication release request to the controller 2 (FIG. 14D, OP21 to OP23). The secure communication release request includes secure communication ID "1", which is a target of the release.

In S53, the controller 2 receives the secure communication release request (FIG. 15A, OP31, OP32: YES) and searches the destination determination table 24 with secure communication ID "1" as a key.

In S54, the controller 2 notifies switches #1 to #3 detected from the destination determination table 24 of deletion of the PacketIn message transmission instruction (FIG. 15B, OP41, OP42). This notification is provided by a FlowMod message. The FlowMod message transmitted in S53 includes a flow entry deletion instruction and a flow entry to be deleted.

In S55, each of switches #1 to #3 receives the FlowMod message from the controller 2 (FIG. 17, OP71, OP72: FlowMod), deletes the relevant entry from the flow table (FIG. 17, OP73: deletion, OP77), and notifies the controller 2 of completion of cancellation of setting (FIG. 17, OP78). The entry deleted in S55 in the flow table is one matching the flow entry included in the FlowMod message, which is registered in S6, S11 and S16 in FIG. 22.

In S56, the controller 2 receives the completion of cancellation of setting from switches #1 to #3 (FIG. 15B, OP43), and deletes the entries detected in S53 in the destination determination table 24 (FIG. 15B, OP44). In S57, the controller 2 notifies the security communication control apparatus 1 of completion of secure communication path release (FIG. 15B, OP45).

In S58, the security communication control apparatus 1 receives the completion of secure communication release from the controller 2 (FIG. 14D, OP24), and transmits a secure communication release request to destination terminal #B. The secure communication release request transmitted in S57 includes secure communication ID "1", which is a target of the release.

In S59, destination terminal #B receives the secure communication release request (FIG. 20, OP111, OP112: release request), and deletes an entry in the security communication management table 44, the entry matching secure communication ID "1" included in the secure communication release request (FIG. 20, OP115). In S60, destination terminal #B notifies the security communication control apparatus 1 of an end of the release processing (FIG. 20, OP116).

In S60, the security communication control apparatus 1 receives the notice of the end of the release processing from destination terminal #B (FIG. 14D, OP26), and deletes, e.g., the secure communication ID, the confirmation position and the dummy value from the entry including secure communication ID "1" in the communication path information table 14 (FIG. 14D, OP27). In S61, the security communication control apparatus 1 notifies source terminal #A of an end of the secure communication path release processing (FIG. 14D, OP28).

In S62, source terminal #A receives the end of the secure communication path release processing (FIG. 19A, OP98) and deletes the entry including secure communication ID "1" in the security communication management table 44 (FIG. 19A, OP99).

<Operation and Effects of First Embodiment>

In the first embodiment, a secure communication packet is created by inserting an original destination address into a payload and storing a random number into a destination address field of a header, and transmitted. A value of the destination address field in the header, which is used for flow identification is different among packets in a same flow, and thus, even if secure communication packets are abstracted on a path by a third party, the third party is unable to collect packets in a same flow. Therefore, the first embodiment can make it difficult for the third party to identify a flow.

In the first embodiment, the random number stored in the destination address field of the header is calculated for each packet. Therefore, the value of the destination address field of the header differs depending on the packet, which makes flow identification more difficult.

In the first embodiment, a confirmation position in a header of a secure communication packet indicates a position in a payload where an original destination address is stored. In the destination address field of the header, a random number calculated for each packet is stored, and thus, the position in the payload where the original destination address is stored also differs depending on the packet. In other words, the position in the payload where the original destination address is stored is not consistent, which makes flow identification more difficult and thus enhances security.

In the first embodiment, the confirmation position in the header of the secure communication packet is determined for each secure communication, that is, for each flow. Consequently, the confirmation position in the header of the secure communication packet is not consistent among flows in the communication system 100, which makes secure communication flow identification more difficult and enhances security.

In the first embodiment, a source communication terminal 4 transmits dummy packets at a predetermined rate in a secure communication. Also, a value indicating a dummy packet is stored in a position in a payload, the position corresponding to a value indicated by a bit string at a confirmation position in a header, is stored. Therefore, it is possible to make it difficult for a third party to identify that the relevant packet is a dummy packet, enabling secure communication enhancement.

Also, in the first embodiment, if the security communication control apparatus 1 receives a secure communication establishment request from a source communication terminal 4, the security communication control apparatus 1 transmits a secure communication setting request to the controller 2. The controller 2 instructs each switch to, upon reception of a secure communication packet, transmit a PacketIn message to the controller 2. Upon reception of a secure communication packet by means of a PacketIn message, the controller 2 determines a forwarding destination of the packet based on an original destination address in a payload. Therefore, transmission of a secure communication setting request by the security communication control apparatus 1 enables a secure communication packet to be forwarded to an original destination by a switch 3 in the communication system 100.

Secure communication setting requests provided from the security communication control apparatus 1 to the controller 2, a source communication terminal 4 and a destination communication terminal 4 each include information on a confirmation position in a header. Consequently, the source communication terminal 4 can transmit a secure communication packet. The controller 2 can obtain an original destination address for the secure communication packet from a payload and thus can determine a forwarding destination. In other words, transmission of the secure communication setting request from the security communication control apparatus 1 enables a secure communication to be performed between the source communication terminal 4 and the destination communication terminal 4 in the communication system 100.

The security communication control apparatus 1 determines that the "operation type" of each switch 3 on the path between the source communication terminal 4 and the destination communication terminal 4 is any of "reception-side", "transmission-side" and "relay", and provides a secure communication setting request with the determined "operation type" included therein to the controller 2. The controller 2 performs processing on a secure communication packet included in a PacketIn message according to the "operation type" of the switch 3 that is a source of the PacketIn message.

If the "operation type" is "transmission-side", the controller 2 converts a normal packet into a format for a secure communication packet and transmits the converted packet to the switch 3 that is the source of the PacketIn message. If the "operation type" is "reception-side", the controller 2 converts a secure communication packet into a format for a normal packet, and transmits the converted packet to the switch 3 that is the source of the PacketIn message. Consequently, even if there is an external network on the path between the source communication terminal 4 and the destination communication terminal 4, secure communication can be performed.

Also, if the "operation type" is "transmission-side", the controller 2 causes the switch 3 that is the source of the PacketIn message to create dummy packets at a predetermined rate and forwards the dummy packets. Where the "operation type" is "reception-side", if a secure communication packet is a dummy packet, the controller 2 drops the dummy packet. Consequently, even if there is an external network on the path between the source communication terminal 4 and the destination communication terminal 4, the dummy packet can be prevented from flowing to the external network. Also, when a secure communication has travelled through the external network, dummy packets can be inserted again into the secure communication.

As a result of the security communication control apparatus 1 transmitting a secure communication setting request to the controller 2, secure communication is enabled in a system that collectively manages switches 3 such as an SDN.

The communication apparatus, the communication system, the communication control apparatus, the communication method and the communication control method disclosed can make it difficult for a third party to identify a flow.

<Modification 1>

In the first embodiment, an original destination address is inserted in a payload of a secure communication packet and a random number is stored in a destination address field of a header. It is possible that an original source address of a secure communication packet is inserted in a payload instead of a destination address and a random number is stored in a source address field of a header.

In the case of Modification 1, the destination address of the packet is an original destination address, and the packet is delivered to a destination communication terminal 4 by means of normal forwarding processing according to the destination address in switches 3 and a relay apparatus in the secure network. Thus, in Modification 1, a security communication control apparatus 1 may transmit no secure communication setting request to a controller 2. Also, in Modification 1, the controller 2 may include no destination determination table 24.

Also, in the case of Modification 1, an entry in a communication path information table 14 in the security communication control apparatus 1 may include items such as secure communication ID, source, destination, confirmation position and dummy value. However, the confirmation position indicates a confirmation position in a source address field.

In the case of Modification 1, upon reception of a secure communication establishment request from the source communication terminal 4, the security communication control apparatus 1 determines a secure communication ID and a confirmation position, and transmits a secure communication setting request to the source and destination communication terminals 4.

The source communication terminal 4 stores a random number in a source address field of a header of a packet. Also, the source communication terminal 4 stores an original source address (address of the own apparatus) into a position in a payload, the position corresponding to a value indicated by a bit string at the confirmation position in a source address field of a header, and transmits the packet.

The destination communication terminal 4 determines whether or not a source address registered in a security communication management table 44 is stored at the position in the payload, the position being indicated by the bit string at the confirmation position in the source address field of the header of the received packet. If a source address registered in the security communication management table 44 is stored at the position in the payload, the destination communication terminal 4 retrieves data in the received packet. If no source address registered in the security communication management table 44 is stored at the position in the payload, the destination communication terminal 4 drops the received packet.

Here, in Modification 1, also, dummy packets are created and transmitted at a predetermined rate.

However, if flow control is performed by a relay apparatus for secure communication, as in the first embodiment, the security communication control apparatus 1 transmits a secure communication setting request to the controller 2, and the controller 2 includes a destination determination table 24. The communication path information table 14 in the security communication control apparatus 1 has a data structure that is similar to that of the first embodiment.

In this case, the security communication control apparatus 1, the controller 2 and the switches 3 each perform processing similar to that of the first embodiment with the "destination address" replaced with the "source address". In other words, if a switch 3 receives a packet, a destination address of which is an address registered in a packet forwarding table 35, the switch 3 transmits a PacketIn message to the controller 2. Upon reception of the PacketIn message, the controller 2 performs processing according to the destination determination table 24 and transmits a PacketOut message to the switch 3.

According to Modification 1, a random number is stored in a source address in a header, making it difficult for a third party to identify a flow. The source address field in the header in Modification 1 is an example of "first field". The original source address in Modification 1 is an example of "first information". The value stored in the source address field of the header instead of the original source address in Modification 1 is an example of "second information".

<Modification 2>

On a path between a source communication terminal 4 and a destination communication terminal 4, a destination address may be substituted with a random number between two certain apparatus, and a source address may be substituted with a random number between two other certain apparatuses. For example, in the communication system 100, a destination address may be substituted with a random number in a section from source terminal #A to switch #2 and a source address may be substituted with a random number in a section from switch #3 to destination terminal #B.

In Modification 2, each entry in a communication path information table 14 in a security communication control apparatus 1 is divided into a section in which a destination address is substituted with a random number and a section in which a source address is substituted with a random number. A "confirmation position" in an entry in a section in which a destination address is substituted with a random number, information on a confirmation position in a destination address field is stored. In a "confirmation position" in an entry in a section in which a source address is substituted with a random number, information on a confirmation position in a source address field is stored. In Modification 2, the security communication control apparatus 1 may perform processing that is similar to that of the first embodiment, based on the aforementioned communication path information table 14.

A controller 2 instructs a switch 3 in a section in which a destination address is substituted with a random number to, if a source address is a designated address, transmit a PacketIn message. The controller 2 instructs a switch 3 in a section in which a source address is substituted with a random number to, if a destination address is a designated address, transmit a PacketIn message.

If a confirmation position included in a secure communication setting request is a position in a destination address, the source and destination communication terminals 4 perform processing similar to that of the first embodiment. If a confirmation position included in a secure communication setting request is a position in a source address, the source and destination communication terminals 4 perform processing that is similar to that of Modification 1.

In Modification 2, on a path between a source and a destination, a section in which a destination address is substituted with a random number and a section in which a source address is substituted with a random number are mixed. Consequently, it is possible to make flow identification difficult, enabling security enhancement.

<Modification 3>

In Modification 3, both an original destination address and a source address are stored at respective predetermined positions in a payload, and a random number is stored in each of a destination address field and a source address field of a header. In Modification 3, for example, in order to clearly indicate a secure communication packet, a flag indicating secure communication is stored in an IP header.

A source communication terminal 4 sets a flag indicating secure communication in a header of a secure communication packet, and substitutes a destination address and a source address in the header with respective random numbers. The source communication terminal 4 inserts an original destination address into a position in a payload, the position being indicated by a bit string at a confirmation position in the destination address in the header. Likewise, the source communication terminal 4 inserts an original source address into a position in the payload, the position corresponding to a value indicated by a bit string at a confirmation position in the source address in the header.

If a flag indicating secure communication in a header of a received packet is set, a destination communication terminal 4 obtains an original destination address and a source address from a payload and retrieves data. More specifically, the destination communication terminal 4 obtains a destination address and a source address from respective positions in the payload, the positions corresponding to respective values indicated by bit strings at confirmation positions in destination address and source address fields of the header, and deletes the destination address and the source address from the payload.

A controller 2 and switches 3 perform processing that is similar to that of the first embodiment. Or, the controller 2 and the switches 3 may detect that a received packet is a secure communication packet based on a flag indicating secure communication in a header of the received packet and perform the processing in the first embodiment and Modification 1.

According to Modification 3, an original destination address and a source address in a header are substituted with respective random numbers, enabling further security enhancement. The source address and destination address fields in Modification 3 are examples of "first field". The source address and the destination address in Modification 3 are examples of "first information". Values stored in the source address and destination address fields of the header instead of an original source address and an original destination address in Modification 3 are examples of "second information".

<Others>

Although in the first embodiment and Modifications 1 to 3, the security communication control apparatus 1 and the controller 2 are described as separate apparatuses, the present invention is not limited to this case. The security communication control apparatus 1 and the controller 2 may be included in a same apparatus.

Also, although in the first embodiment and Modifications 1 to 3, the description has been provided on the premise that the communication network 100 is an SDN network, the communication network 100 is not limited to an SDN network. The communication network 100 may be a network including, e.g., routers and/or layer-3 switches.

If the communication network 100 is a network including, e.g., routers and/or layer-3 switches, there may be no controller 2 in the communication network 100. The security communication control apparatus 1 transmits a secure communication setting request to the router and/or the layer-3 switches. The routers and/or the layer-3 switches each include a destination determination table 24 for a controller 2, and performs processing that is similar to processing performed on a packet included in a PacketIn message by the controller 2 in the first embodiment, based on the destination determination table 24.

Also, although in the first embodiment and Modifications 1 to 3, the security communication control apparatus 1 determines the confirmation position(s) in the destination or/and source address field(s) of the header, for each security communication, instead of this, the source communication terminal 4 may determine the confirmation position(s).

Also, although in the first embodiment and Modifications 1 to 3, the destination address or/and the source address in the header are substituted with respective random numbers, other information used as flow identification information in the header may be substituted with a random number. Examples of the other information used as flow identification information in the header include, e.g., a TCP/UDP port number and a protocol number. In this case, the information substituted with a random number in the header is an example of "first information".

Also, in the first embodiment and Modifications 1 to 3, a value indicating a dummy packet is stored in a payload. Instead of this, a value indicating a dummy packet may be stored in a field such as a destination address or source address field to be substituted with a random number in a header.

In the first embodiment, the description has been provided on a communication in the direction from source terminal #A to destination terminal #B. For example, if there is a returned packet in a communication from source terminal #A to destination terminal #B, a secure communication with destination terminal #B as a source and source terminal #A as a destination is established. In this case, a secure communication establishment request is transmitted from destination terminal #B to the security communication control apparatus 1.

<Recording Medium>

A program for causing a computer or another machine or apparatus (hereinafter, "computer or the like") to provide any of the above-described functions can be recorded into a recording medium that can be read by a computer or the like. The program in the recording medium is read into the computer or the like and executed, enabling provision of the function.

Here, the recording medium that can be read by the computer or the like refers to a non-transitory recording medium that can store information such as data and/or programs by means of electrical, magnetic, optical, mechanical or chemical action and can be read from the computer or the like. From among such recording mediums, ones that can be removed from the computer or the like include, for example, a flexible disk, a magnetooptical disk, a CD-ROM, a CD-R/W, DVD, a Blu-ray disk, a DAT, an 8 mm tape and a memory card such as a flash memory. Also, recording mediums fixed to the computer or the like include, e.g., a hard disk and a ROM (read-only memory). Furthermore, an SSD (solid state drive) can be used as either a recording medium that can be removed from the computer or the like or a recording medium fixed to the computer or the like.

All examples and conditional language provided herein are intended for the pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication apparatus comprising:
a memory, and
a processor configured to transmit a plurality of second packets obtained from a plurality of first packets, wherein each of the plurality of first packets includes a header including a first field, and a payload, and includes first information stored in the first field, and the plurality of first packets include common identification information that enables flow identification, and wherein each of the plurality of second packets includes second information in the first field instead of the first information, and includes the first information inserted in the payload, and a value of the second information is different between at least two packet groups from among the plurality of first packets,
wherein the processor configured to transmit at least one dummy packet mixed with the plurality of second packets, the at least one dummy packet being not included in the plurality of first packets and storing information indicating a dummy packet.

2. The communication apparatus according to claim 1,
wherein the processor is configured to obtain the plurality of second packets by, for each of the plurality of first packets, storing the second information into the first field instead of the first information, and inserting the first information into the payload.

3. The communication apparatus according to claim 2,
wherein the processor is configured to determine the second information for each of the plurality of first packets.

4. The communication apparatus according to claim 3,
wherein the processor is configured to insert the first information into a position in the payload, the position corresponding to a value indicated by a part of the second information, the part being a predetermined part of the first field.

5. The communication apparatus according to claim 4,
wherein the predetermined part of the first field is determined for each of packet groups formed by the plurality of first packets.

6. The communication apparatus according to claim 1,
wherein the first information is either or both of a destination address and a source address.

7. A communication apparatus comprising:
a memory, and
a processor configured to receive packets including a plurality of second packets obtained from a plurality of first packets, wherein each of the plurality of first packets includes a header including a first field, and a payload, and includes first information stored in the first field, and the plurality of first packets include common identification information that enables flow identification, and wherein each of the plurality of second packets includes second information in the first field instead of the first information and includes the first information inserted in the payload, and a value of the second information is different between at least two packet groups from among the plurality of first packets,
wherein the processor is configured to:
store third information stored in a second field of the header in the memory, the second field being different from the first field;
delete the first information from the payload of a received packet and obtain data included in the payload of the received packet when the third information is stored in the second field of a packet received by the reception unit,
receive at least one dummy packet, the at least one dummy packet being not included in the plurality of first packets, storing information indicating a dummy packet, and being transmitted in such a manner that the at least one dummy packet is mixed with the plurality of second packets; and
drop a received packet when the information indicating a dummy packet is stored in the received packet.

8. The communication apparatus according to claim 7, wherein the second information is determined for each of the plurality of first packets.

9. The communication apparatus according to claim 7, wherein the processor is configured to determine whether or not the first information is stored at a position in the payload of the received packet, the position corresponding to a value indicated by a part of the second information, the part being a predetermined part of the first field, and when the first information is not stored, drop the received packet.

10. The communication apparatus according to claim 9, wherein the predetermined part of the first field is determined for each of packet groups formed by the plurality of first packets.

11. A communication control apparatus comprising:
a memory and
a processor configured to:
receive a request for a communication from a transmission apparatus to a reception apparatus for transmitting a plurality of second packets obtained from a plurality of first packets; and
transmit an instruction for one or more relay apparatuses on a path between the transmission apparatus and the reception apparatus to forward, upon reception of a second packet, the second packet based on first information inserted in payload of the second packet, when the communication request is received,
wherein each of the plurality of first packets includes a header including a first field, and a payload, and includes the first information stored in the first field, and the plurality of first packets include common identification information that enables flow identification, and wherein each of the plurality of second packets includes second information in the first field instead of the first information, and includes the first information inserted in a payload, and a value of the second information is different between at least two packet groups from among the plurality of first packets,
wherein the processor is configured to:
determine to notify a first relay apparatus of a first instruction, wherein a forwarding destination for the first relay apparatus is an external network on the path, and the first instruction is an instruction to, upon reception of a second packet, obtain a first packet from the second packet and forward the first packet to the external network;
determine to notify a second relay apparatus of a second instruction, wherein a forwarding source for the second relay apparatus is an external network on the path, and the second instruction is an instruction to, upon reception of a first packet, obtain a second packet from the first packet and forward the second packet to a forwarding destination,
determine to notify the first relay apparatus of a value indicating a dummy packet and a third instruction to, when the value indicating a dummy packet is stored in a received packet, to drop the received packet; and
determine to notify the second relay device of the value indicating a dummy packet and a forth instruction to transmit a dummy packet in such a manner that the dummy packet is mixed with the obtained second packets, the dummy packet including the value indicating a dummy packet.

12. The communication control apparatus according to claim 11, wherein when the communication request is received, the processor is configured to transmit information relating to a position in the payload of the second packet where the first information is inserted, to the one or more relay apparatuses, and transmit the information relating to the position in the payload where the first information is inserted, to the transmission apparatus and the reception apparatus.

13. The communication control apparatus according to claim 12, wherein the processor is configured to determine a predetermined part of the first field in which information relating to a position in the payload where the first information is inserted is stored, for each of packet groups formed by the plurality of first packets.

14. The communication control apparatus according to claim 11, wherein the processor is configured to transmit the instruction for the one or more relay apparatuses on the path, to a relay control apparatus that controls the one or more relay apparatuses.

15. The communication control apparatus according to claim 11, wherein the second information is determined for each of the plurality of first packets.

* * * * *